United States Patent
Ostrovsky et al.

(10) Patent No.: US 12,013,136 B2
(45) Date of Patent: Jun. 18, 2024

(54) APPARATUS AND METHODS FOR CONTROLLING A VENTILATION MECHANISM

(71) Applicant: Leviton Manufacturing Co., Inc., Melville, NY (US)

(72) Inventors: Michael Ostrovsky, Brooklyn, NY (US); Marc Gallo, Bayside, NY (US); Paul Soccoli, Plainview, NY (US); Alfred Lombardi, Syosset, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 290 days.

(21) Appl. No.: 17/322,990

(22) Filed: May 18, 2021

(65) Prior Publication Data
US 2021/0278101 A1 Sep. 9, 2021

Related U.S. Application Data

(63) Continuation of application No. 15/973,103, filed on May 7, 2018, now Pat. No. 11,015,831, which is a (Continued)

(51) Int. Cl.
*F24F 11/65* (2018.01)
*F24F 11/00* (2018.01)
(Continued)

(52) U.S. Cl.
CPC .......... *F24F 11/65* (2018.01); *F24F 11/0001* (2013.01); *F24F 11/0008* (2013.01); (Continued)

(58) Field of Classification Search
CPC .. F24F 11/65; F24F 11/62; F24F 11/30; F24F 11/61; F24F 11/0001; F24F 11/0008; F24F 2110/20; F24F 2221/17
See application file for complete search history.

(56) References Cited

U.S. PATENT DOCUMENTS

| 4,136,822 A | 1/1979 | Felter |
| 4,460,122 A | 7/1984 | Jardinier |

(Continued)

FOREIGN PATENT DOCUMENTS

| JP | H02161239 A | 6/1990 |
| JP | H07265646 A | 10/1995 |

(Continued)

OTHER PUBLICATIONS

Kamimura, Ventilating Fan, Jan. 26, 1999, JPH1123027A, Whole Document (Year: 1999).*

(Continued)

*Primary Examiner* — Larry L Furdge
(74) *Attorney, Agent, or Firm* — Matthew M. Hulihan; Heslin Rothenberg Farley & Mesiti PC

(57) ABSTRACT

The present disclosure generally provides controls, apparatus, systems and methods for controlling a ventilation mechanism to efficiently manage the relative humidity of an area. The controls, apparatus, systems and methods utilize sensed relative humidity information and one or more inputs to provide for efficient automatic and/or manual control a ventilation mechanism in response to high humidity events within the area. The controls, apparatus, systems and methods provided herein efficiently automatically activate a ventilation mechanism through the use of sensed relative humidity information and user input. The controls, apparatus, systems and methods provided herein efficiently automatically deactivate a ventilation mechanism through the use of sensed relative humidity information and user input.

19 Claims, 7 Drawing Sheets

Related U.S. Application Data continuation of application No. 14/289,285, filed on May 28, 2014, now Pat. No. 9,976,764.

(51) Int. Cl.
*F24F 11/30* (2018.01)
*F24F 11/61* (2018.01)
*F24F 11/62* (2018.01)
*F24F 110/20* (2018.01)

(52) U.S. Cl.
CPC .............. *F24F 11/30* (2018.01); *F24F 11/61* (2018.01); *F24F 11/62* (2018.01); *F24F 2110/20* (2018.01); *F24F 2221/17* (2013.01)

(56) References Cited

U.S. PATENT DOCUMENTS

| | | |
|---|---|---|
| 4,659,009 A | 4/1987 | Newell, III |
| 4,916,291 A | 4/1990 | Jan |
| 4,916,642 A | 4/1990 | Kaiser et al. |
| 4,942,364 A | 7/1990 | Nishijima et al. |
| 4,953,784 A | 9/1990 | Yasufuku et al. |
| 5,063,283 A | 11/1991 | Orazi |
| 5,082,173 A | 1/1992 | Poehlman et al. |
| 5,170,935 A | 12/1992 | Federspiel et al. |
| 5,228,306 A | 7/1993 | Shyu et al. |
| 5,232,152 A | 8/1993 | Tsang |
| 5,346,128 A | 9/1994 | Wacker |
| 5,365,154 A | 11/1994 | Schneider et al. |
| 5,450,893 A | 9/1995 | Galba et al. |
| 5,578,753 A | 11/1996 | Weiss et al. |
| 5,675,979 A | 10/1997 | Shah |
| 5,737,934 A | 4/1998 | Shah |
| 5,810,244 A | 9/1998 | Tanenbaum |
| 5,884,694 A | 3/1999 | Tanenbaum |
| 5,887,651 A | 3/1999 | Meyer |
| 6,204,623 B1 | 3/2001 | Levy et al. |
| 6,220,039 B1 | 4/2001 | Kensok et al. |
| 6,230,980 B1 | 5/2001 | Hudson |
| 6,557,771 B2 | 5/2003 | Shah |
| 6,570,139 B1 | 5/2003 | Levy et al. |
| 6,798,341 B1 | 9/2004 | Eckel et al. |
| 6,812,437 B2 | 11/2004 | Levy et al. |
| 6,920,874 B1 | 7/2005 | Siegel |
| 6,926,602 B1 | 8/2005 | Reese |
| 6,935,570 B2 | 8/2005 | Acker, Jr. |
| 6,958,010 B1 | 10/2005 | Reese |
| 6,960,745 B2 | 11/2005 | Levy et al. |
| 7,178,350 B2 | 2/2007 | Shah |
| 7,325,748 B2 | 2/2008 | Acker, Jr. |
| 7,339,471 B1 | 3/2008 | Chan et al. |
| 7,632,178 B2 | 12/2009 | Meneely |
| 7,690,583 B2 | 4/2010 | Cherewatti et al. |
| 7,766,734 B2 | 8/2010 | Dietz et al. |
| 7,979,163 B2 | 7/2011 | Terlson et al. |
| 7,984,859 B2 | 7/2011 | Goodwin et al. |
| 8,118,236 B2 | 2/2012 | Lestage et al. |
| 8,214,085 B2 | 7/2012 | Boudreau et al. |
| 9,976,764 B2 * | 5/2018 | Ostrovsky ............ F24F 11/0001 |
| 11,015,831 B2 * | 5/2021 | Ostrovsky ................ F24F 11/65 |
| 2004/0041036 A1 | 3/2004 | Acker, Jr. |
| 2005/0087612 A1 | 4/2005 | Fuller |
| 2005/0125083 A1 | 6/2005 | Kiko |
| 2005/0155362 A1 | 7/2005 | Shah |
| 2005/0252983 A1 | 11/2005 | Acker, Jr. |
| 2005/0257537 A1 | 11/2005 | Chang et al. |
| 2005/0269418 A1 | 12/2005 | Fuller |
| 2006/0154596 A1 | 7/2006 | Meneely |
| 2006/0213000 A1 | 9/2006 | Kimble et al. |
| 2006/0255164 A1 | 11/2006 | Oppermann et al. |
| 2006/0283963 A1 | 12/2006 | Fuller |
| 2006/0286922 A1 | 12/2006 | Roux et al. |
| 2007/0145158 A1 | 6/2007 | Dietz et al. |
| 2007/0197159 A1 | 8/2007 | Byczynski et al. |
| 2008/0011863 A1 | 1/2008 | Roux et al. |
| 2008/0143191 A1 | 6/2008 | Laser |
| 2008/0182506 A1 | 7/2008 | Jackson et al. |
| 2009/0057430 A1 | 3/2009 | Cherewatti et al. |
| 2009/0120631 A1 | 5/2009 | Chou et al. |
| 2009/0188984 A1 | 7/2009 | Al-Qassem |
| 2010/0006661 A1 | 1/2010 | Goodwin et al. |
| 2010/0024106 A1 | 2/2010 | Katsumi et al. |
| 2010/0078494 A1 | 4/2010 | Mularoni et al. |
| 2010/0105311 A1 | 4/2010 | Meneely, Jr. |
| 2010/0198411 A1 | 8/2010 | Wolfson |
| 2012/0048952 A1 | 3/2012 | Slingsby |
| 2012/0145802 A1 | 6/2012 | Peterson et al. |
| 2012/0228393 A1 | 9/2012 | Storm et al. |
| 2012/0234527 A1 * | 9/2012 | Murayama ......... H05K 7/20709 165/287 |
| 2013/0020397 A1 | 1/2013 | Branham et al. |
| 2018/0259211 A1 | 9/2018 | Ostrovsky et al. |
| 2020/0412070 A1 | 12/2020 | Owen et al. |

FOREIGN PATENT DOCUMENTS

| | | | |
|---|---|---|---|
| JP | H09222253 A | | 8/1997 |
| JP | H1123027 A | * | 1/1999 |
| JP | 2004290262 A | | 10/2004 |

OTHER PUBLICATIONS

Miyoshi et al., Controller for Dehumidifier, Aug. 26, 1997, JPH09222253A, Whole Document (Year: 1997).*
Dew Stop, Model FS-100 Humidity Sensing Fan Switch, Printed Dec. 3, 2013. 1 pg.
NuTone, Model QTXEN110S Humidity Sensor Fan Product Overview, Printed Aug. 2, 2013. 1 pg.
NuTone, Model QTXEN110S Humidity Sensor Fan Specification Sheet, Printed Aug. 2, 2013. 2 pgs.
Broan, Model QXTE110S Humidity Sensor Fan Manual, Printed Jun. 7, 2013. 8 pgs.
Broan, Model QXTE110S Humidity Sensor Fan Specification Sheet, Printed Jun. 7, 2013. 2 pgs.
Broan, Model MHS120L Sensaire® Humidity Sensing Bath Fan/Light/Night light Specification Sheet, Printed Jun. 7, 2013. Available at http://www.kitchensource.com/bathroom-fans/pdf/br-mhs120l_spec.pdf. 2 pgs.
Office Action in U.S. Appl. No. 14/289,285 dated Feb. 10, 2017, 25 pgs.
Office Action in U.S. Appl. No. 14/289,285 dated Aug. 10, 2017, 32 pgs.
Notice of Allowance in U.S. Appl. No. 14/289,285 dated Jan. 25, 2018, 7 pgs.
Office Action in U.S. Appl. No. 15/973,103 dated Nov. 5, 2019, 21 pgs.
Final Office Action in U.S. Appl. No. 15/973,103 dated Apr. 20, 2020, 20 pgs.
Office Action in U.S. Appl. No. 15/973,103 dated Aug. 5, 2020, 17 pgs.
Notice of Allowance in U.S. Appl. No. 15/973,103 dated Feb. 19, 2021, 11 pgs.
Office Action issued in U.S. Appl. No. 17/647,359 dated Sep. 14, 2023, 25 pgs.

* cited by examiner

APPARATUS AND METHODS FOR CONTROLLING A VENTILATION MECHANISM

TECHNICAL FIELD

The present disclosure generally relates to controls, apparatus, systems and methods for managing the humidity of an area.

BACKGROUND

Ventilation mechanisms, such as exhaust fans, are typically used in bathrooms and other high humidity areas to manage or control the humidity and moisture levels that occur during and after, for example, a shower, bath or other high humidity event that increases the humidity and/or moisture levels in the area. Commonly, the control of ventilation mechanisms is accomplished by "on" and "off" switches. These switches provide basic functionality via manual operation of the control. In many cases, however, a user will turn the ventilation mechanism on but not remember to turn the ventilation mechanism off or not leave it on long enough. Such activity leads to the waste either of energy when the ventilation mechanism runs longer than is needed and/or inadequate moisture removal.

To address these concerns, countdown timers are occasionally used as a control mechanism. Countdown timer controls still require manual activation, but automatically turn off the ventilation mechanism without user intervention. Countdown timer controls can still lead to energy waste and/or inadequate moisture removal when the countdown time is inadequate for a particular high humidity/moisture event. Countdown timer controls can also lead to frustration from users when the ventilation mechanism is turned off too early, such as while a bath or shower is still taking place.

There is a need for further controls, apparatus, system, and methods for managing the humidity of an area.

SUMMARY

In a first aspect, the present invention provides a control for automatically turning off a ventilation mechanism that was turned on at an activation time to manage relative humidity in an area. The control includes an interface operable to obtain a run time input, and wherein the control is operable to receive relative humidity information sensed in the area by at least one relative humidity sensor and automatically turn off the ventilation mechanism when a) a period of time after the activation time corresponds to about the run time input, b) a sensed relative humidity level in the area is about or less than a first threshold relative humidity level, and, c) the sensed relative humidity level is either i) about or less than a second threshold relative humidity level different from the first threshold relative humidity level or ii) between about the first threshold relative humidity level and the second threshold relative humidity level.

In a second aspect, the present invention provides a method for automatically turning off a ventilation mechanism that was turned on at an activation time to manage relative humidity in an area. The method includes comprising receiving relative humidity information sensed in the area, receiving run time input, and utilizing the sensed relative humidity information and the run time input to automatically turn off the ventilation mechanism when: a) a period of time after the activation time corresponds to about the run time input, b) a sensed relative humidity level in the area is about or less than a first threshold relative humidity level, and c) the sensed relative humidity level is either i) about or less than a second threshold relative humidity level different from the first threshold relative humidity level, or ii) between about the first threshold relative humidity level and a second threshold relative humidity level.

DRAWINGS

These and other objects, features, and advantages of this disclosure will become apparent from the following detailed description of the various aspects of the disclosure taken in conjunction with the accompanying drawings in which.

DETAILED DESCRIPTION

Figure 1:
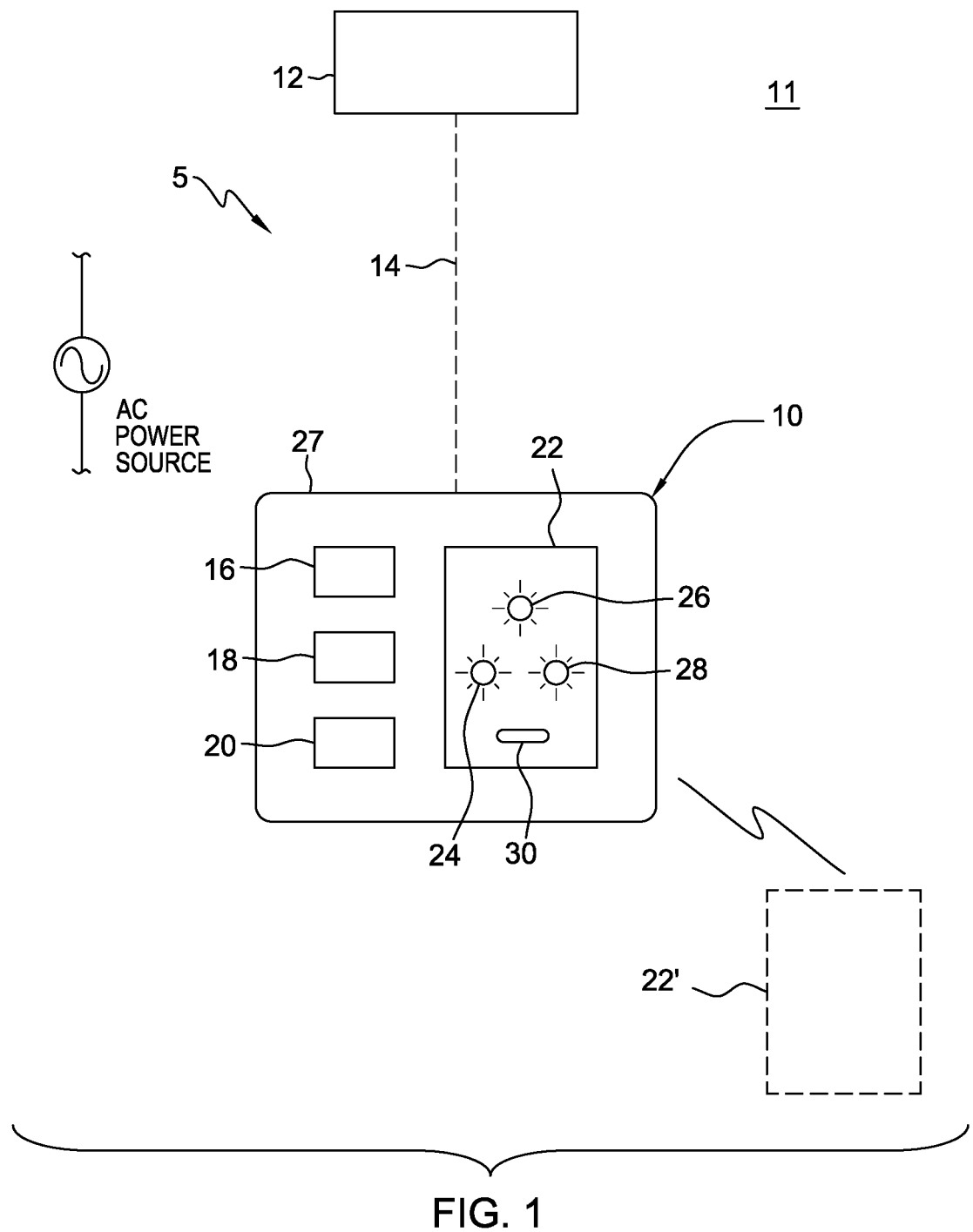
FIG. 1 is a diagram of an exemplary embodiment of a ventilation system in accordance with the present disclosure.

Generally, aspects of the present disclosure are directed to management of humidity and/or condensation in an area. For example, the present disclosure may be operable for controlling a bathroom fan or ventilation fan. In addition, aspects of the present disclosure may allow for the ability to manage humidity in a variety of different circumstances, for example, by providing user-selectable adjustable inputs that may allow for customization and/or optimization in the management of humidity in a variety of locations and under a variety of circumstances. An interface such as a user interface may be provided and operable for receiving user-selectable adjustable inputs for use in managing the humidity and/or condensation in an area. Activation of a fan may be based on user-selectable adjustable inputs such as a sensitivity adjustment for controlling response to a change in humidity, a time adjustment for setting a minimum time a fan will be on, and a humidity adjustment for setting a minimum humidity level. The present disclosure is also generally directed to turning off the fan such as but not limited to customizing and/or optimizing the deactivating or turning off of a fan to manage of humidity and/or condensation in an area.

Other aspects of the present disclosure may include the ability to automatically or manually turn off the fan which was activated due to small event triggering, e.g., a rise in humidity that only lasts a short time such as washing one hands and not a shower. Still other aspects of the present disclosure may include humidity management having adaptive learning capability to manage changing humidity over relatively long periods of times, e.g. due to changes in seasonal ambient conditions such as different humidity levels observed in spring, summer, fall, and winter seasons of a year. The adaptive learning capability may be a standalone capability (e.g., without requiring user input) or may be implemented based initially on user-selected inputs. Other aspects of the present disclosure may include management of humidity based on a combination of an occupancy sensor with a humidity sensor. Further aspects for managing humidity are described below.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

As described in further detail below, the present disclosure provides for controls, apparatus, systems and methods for automatically and manually controlling ventilation mechanism to manage the relative humidity level of an area in response to a high humidity/moisture event. The controls, apparatus, systems and methods may provide the ability to manage humidity of an area in a variety of different circumstances. The controls, apparatus, systems and methods may provide user adjustable inputs that allow the controls, apparatus, systems and methods to be flexible and customizable so that they perform advantageously in a variety of locations, circumstances and user preferences. Further, as humidity levels in an area will depend on factors such as but not limited to the size of the area, the availability of air flow into the area, and the strength of the ventilation mechanism, a need exists for controls, apparatus, systems and methods for automatically and manually controlling a ventilation mechanism that provide flexibility in operation to provide acceptable performance in all environmental and installation scenarios.

Referring to FIG. 1, an exemplary embodiment of a ventilation system 5 is shown. The ventilation system 5 may include a ventilation mechanism control 10 for manual and automatic control of at least one ventilation mechanism 12. The ventilation mechanism control 10 may be operable to manually or automatically selectively provide a load control signal to, or otherwise control, the ventilation mechanism 12 such that the ventilation mechanism 12 evacuates, changes, or replaces the air, or otherwise processes the air or environment in an area 11 about the ventilation mechanism 12 to lower the relative humidity, moisture and/or condensation level of the area. Similarly, the control 10 may be operable or configured to manually or automatically control the ventilation mechanism 12 such that the ventilation mechanism 12 stops processing the air or environment in the area 11 when the humidity level therein has returned to an acceptable level. The control 10 may communicate with the ventilation mechanism 12 via a connection 14. The connection 14 between the control 10 and the ventilation mechanism 12 may be a direct or indirect connection, and may be a wired or wireless connection. The control 10 may be operable or configured to control, or communicate with, a load controlling device or conductive switch (not shown) that is in electrical connection with the ventilation mechanism. For example, the controllable conductive switch may be in electrical series connection between a power supply and the ventilation mechanism. The controllably conductive switch may alter operation of the ventilation mechanism by, for example, turning the ventilation mechanism on or off, or by altering the speed or ventilation power or efficiency of the ventilation mechanism; e.g., adjust the speed of a ventilation fan.

Figure 2:
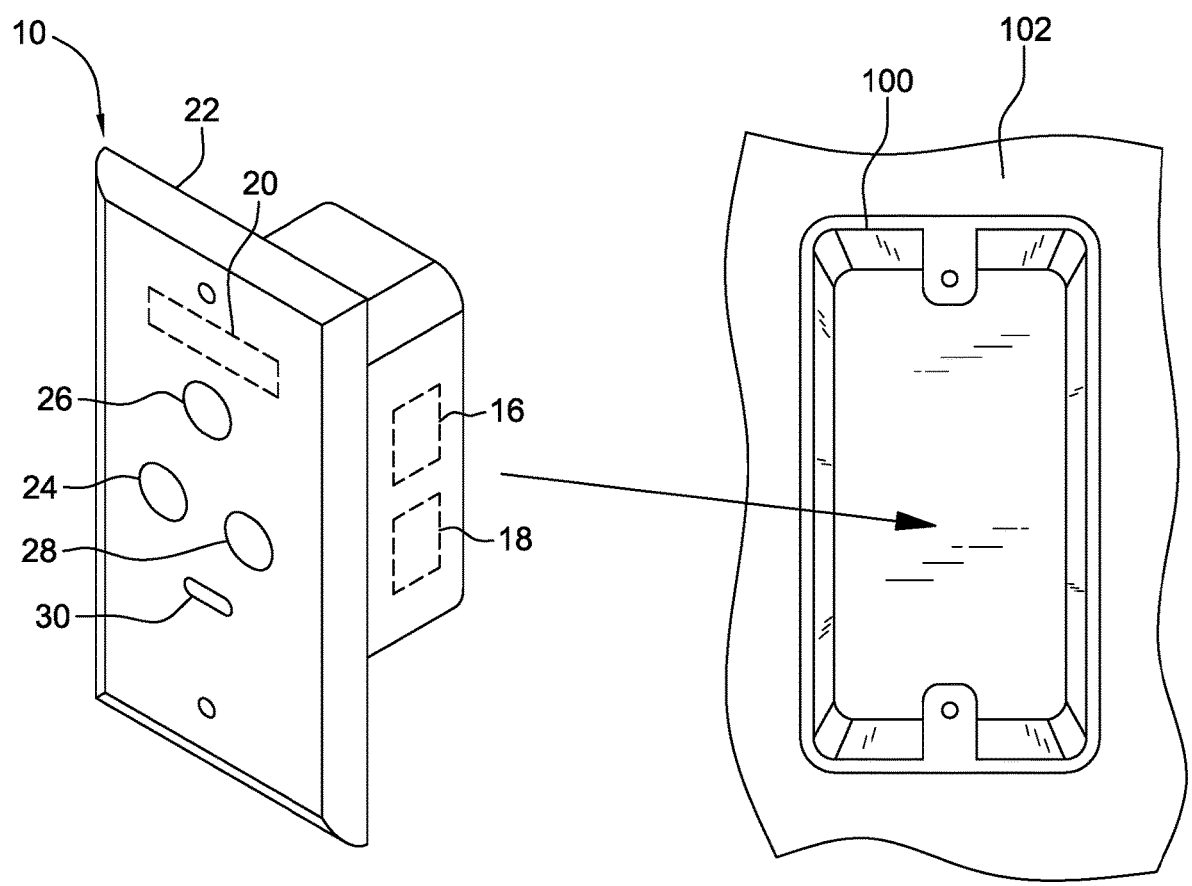
FIG. 2 is a perspective view of an exemplary installation of an exemplary control of the ventilation system of FIG. 1.

As shown in FIG. 2, for example, the control 10 and its various components may be operable or configured in an electrical box 100 positioned on or in a wall 102. The control 10, positioned in the electrical box 100, may be wired to, or otherwise coupled with, the remote ventilation mechanism 12. In alternative embodiments, the control 10 may be integral with the ventilation mechanism 12.

With reference again to FIG. 1 and as explained further below, the control 10 may be operable or configured to include one or more modes of operation in which the control 10 automatically activates and/or deactivates (i.e., turns on and/or off) ventilation mechanism 12 based on programmed logic and/or user input. The control 10 may be operable or configured to include one or more modes of operation in which the control 10 automatically turns on and/or off the ventilation mechanism 12 based on a combination of programmed logic, user input, and current or relatively sensed recent environmental conditions.

The ventilation mechanism 12 may be any mechanism effective in managing or lowering the relative humidity or moisture level in the area 11 about the ventilation mechanism 12. The ventilation mechanism 12 may be one or more exhaust fans or dehumidifiers. The ventilation mechanism 12 and the control 10 may be situated or installed in the same area, or the control 10 may be remote from the ventilation mechanism 12 (and thereby the area in which the humidity or moisture level is managed). The ventilation mechanism 12 may be situated or installed in the ceiling of an area or room, such as but not limited to a bathroom, and the control 10 may be situated or installed on the wall of the area or room. The control 10 may be integral with ventilation mechanism 12. For example, the ventilation mechanism may include the control and be installable in the ceiling or wall of a room.

With reference still to FIG. 1, the control 10 may include several components. For example, the control 10 may include processor a 16, a memory 18, an atmospheric sensor 20, and a control interface 22. The processor 16 and memory 18 may comprise a microprocessor. The processor 16, memory 18, atmospheric sensor 20, and interface 22 may be within a housing 27 of the control 10. The atmospheric sensor may measure/detect atmospheric variables including one or more of temperature, humidity, pressure, air flow, light, vapor, etc.

The processor 16, memory 18, atmospheric sensor 20 and/or interface 22 may not be in the housing 27, and be operable or configured to communicate with the other component(s). For example, the interface 22 may be provided by, or incorporated with, a wireless communication device, such as a smart phone 22' shown in FIG. 1. In another example, the atmospheric sensor 20 may be separate from the processor 16, the memory 18, and the interface 22.

The processor 16 and memory 18 may be configured or otherwise operable to process atmospheric information, such as relative humidity information and/or temperature information, provided by, at least in part, from the atmospheric sensor 20 and one or more user input provided via the interface 22 according to logic stored in the memory 18 to automatically and manually control the ventilation mechanism 12. In this way, the control 10 may be operable or configured to manually and automatically manage or lower the relative humidity of the area 11 in which the ventilation mechanism 12 is installed.

The control 10 may be capable of executing an application. The application, which may be comprised of computer readable program code, may reside on one or more memories of the control 10. The term "logic" used herein may refer to computer readable program code or software executed by processing circuits on the control 10. The memory 18 may include, but is not limited to, computer readable program code or software (i.e., the logic).

The atmospheric sensor 20 may provide information relating to the relative humidity of the environment. For example, the atmospheric sensor 20 may provide an electrical signal that corresponds to a relative humidity reading at a particular time. The control 10 may be operable or configured to read the electrical signal of the atmospheric sensor 20 and, thereby, determine the relative humidity of the area and apply logic stored in (or provided to) the control 10 to determine if, for example, the ventilation mechanism 12 should be automatically activated or deactivated.

The atmospheric sensor 20 may be operable or configured to provide information relating to the change in relative humidity of the environment, and/or the control 10 may be operable or configured to determine the change in relative humidity based on the relative humidity information provided by the atmospheric sensor 20. In this way, the control 10 may be operable or configured to utilize the change in relative humidity of the area with the logic stored in the memory 18 to determine if, for example, the ventilation mechanism 12 should be activated or deactivated. The atmospheric sensor 20 may be positioned in a location that is optimal for favorable humidity detection of an area, and via wired or wireless communication transmit the relative humidity information to another component of the control 10, such as the processor 16 or the memory 18. The atmospheric sensor 20 may be part of a building automation system.

Figure 3:
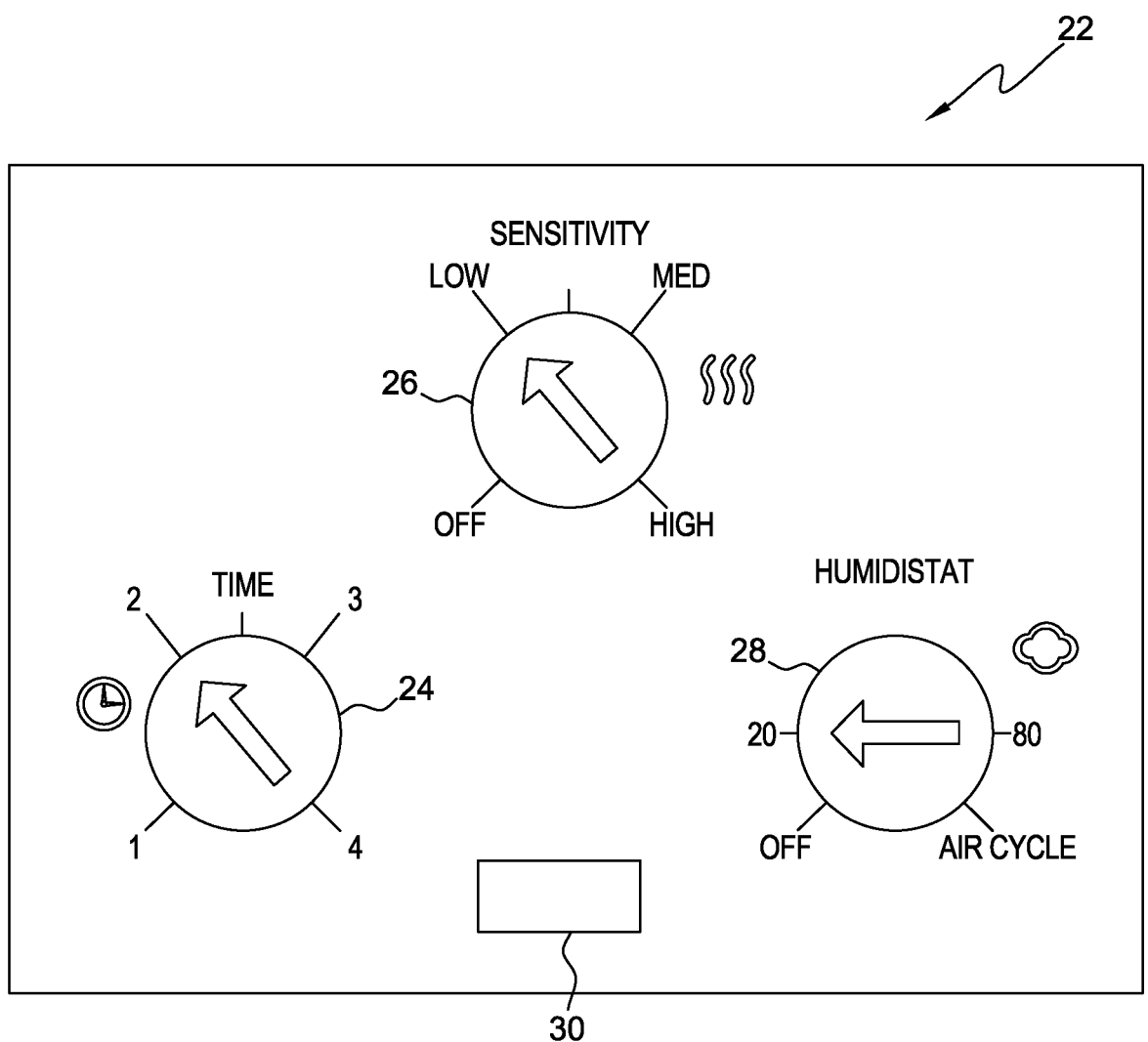
FIG. 3 is a front view of a portion of an exemplary control interface of the ventilation system of FIG. 1.

As shown in FIGS. 1 and 3, the control 10 (FIG. 1) may include interface 22. The interface 22 may include one or more selectable input mechanisms that are operable to enable a user to input or set the control 10 (FIG. 1) in a particular mode and to input or set certain parameters of the control utilized in the automatic activation and deactivation (i.e., on/off) logic of the control, as shown in FIG. 3. The exemplary interface 22 of the exemplary control 10 may include a plurality of selectable input mechanisms, including a selectable time input mechanism 24, a selectable sensitivity input mechanism 26, and a selectable humidity level or humidistat input mechanism 28. As shown in FIG. 3, each selectable input mechanism may include a number of predetermined discrete selection values or settings that a user can select via the particular mechanism. The selectable input mechanisms may allow the user to input any value (i.e., not select between predetermined or discrete values). Each of the selectable input mechanisms may be any type of user selectable input mechanism, such as rotatable selectors, slidable selectors, pushbuttons, etc.

In the illustrative embodiment of FIG. 3, each of the time input mechanism 24, sensitivity input mechanism 26, and selectable humidistat input mechanism 28 may be a trim potentiometer with selectable input values (e.g., substantive or non-zero values) or mode(s) based on the angular position of the particular trim potentiometer. The interface 22 of the control 10 (FIG. 1) may be operable or configured such that the user input value or mode selection of each of the selectable time input mechanism 24, selectable humidity sensitivity input mechanism 26, and selectable humidistat input mechanism 28 is considered or otherwise taken into account by the logic contained therein to manually or automatically activate (i.e., turn on) and thereafter deactivate (i.e., turn off) the ventilation mechanism 12 (FIG. 1).

The selectable time input mechanism 24 may be operable to select from, or input, any number of time unit settings. The control 10 (FIG. 1) may be operable, configured, or programmed to receive, interpret, or otherwise use the time unit setting (i.e., amount or period of time) settings of the selectable time input mechanism 24. For example, the time unit setting may be a minimum run or "on" time of the ventilation mechanism 12 for one or more (e.g., all) of the modes provided by the control (e.g., the time unit setting may correspond to a run time of the ventilation mechanism when one of the automatic or manual modes of the control initiates activation of the ventilation mechanism). The selectable time input mechanism 24 (and the time unit setting associated therewith) allows different users of the control that may experience levels of humidity differently, and therefore desire more or less moisture elimination, to customize the control to their needs or preferences.

In the exemplary embodiment shown in FIG. 3, the selectable time input mechanism 24 of the interface 22 includes a plurality of discrete selectable time unit settings (e.g., time or timeout settings) corresponding to discrete units of time. A user may engage the selectable time input mechanism 24 and select between, or otherwise input, a time value corresponding with a visual and/or tactile indication on the interface 22 and/or selectable time input mechanism 24. In the exemplary embodiment of FIG. 3, the interface 22 includes time unit settings (e.g., time or timeout settings) for the selectable time input mechanism 24 visually indicated by "1", "2", "3", and "4". The user selectable time or timeout settings associated with the selectable time input mechanism 24 may be programmed into the control (e.g., saved into memory). For example, in the exemplary illustrative embodiment of FIG. 3, the "1", "2", "3", and "4" setting indications of the selectable time input mechanism 24 may correspond to input time values or units of 5 minutes, 10 minutes, 20 minutes, and 30 minutes, respectively. In alternative embodiments, any number of the discrete time units may be selectable or input via the time input mechanism 24, and the discrete time units may be of any length, interval, or other configuration metric. In addition, and "OFF" setting indication or position indication may be provided. Further, the user could be provided with a means to specify a multiplier which could be used to apply multiples to predetermined time units.

Similar to the selectable time input mechanism 24, the selectable humidity sensitivity input mechanism 26 may be operable to select from, or input, any number of relative humidity sensitivity settings corresponding to, for example, relative humidity sensitivity settings. The control 10 (FIG. 1) may be operable or configured such that the user selected sensitivity settings of the sensitivity input mechanism 26 correspond to a user's desired sensitivity, if any, of the automatic activation of the ventilation mechanism 12 (FIG. 1) by the control in response to a measured change of the relative humidity of the area being managed as indicated by the atmospheric sensor 20 (FIG. 1). For example, in areas or locations with low ambient humidity it may be desirable so that rapid or significant changes in humidity activate or turn on the fan. In areas or locations with high ambient humidity, it may be desirable for slow or small changes in humidity to activate or turn on the fan.

In the illustrative exemplary embodiment shown in FIG. 3, the selectable sensitivity input mechanism 26 of the interface 22 includes selectable sensitivity humidity settings, and an "OFF" setting. For example, as shown in FIG. 3, a user may manually engage the selectable sensitivity input mechanism 26 and select between, or otherwise input, a sensitivity level corresponding with a visual and/or tactile indication on the interface. For example, the interface 22 may include settings for the selectable humidity sensitivity input mechanism 26 visually indicated by "OFF," "LOW," "MED," and "HIGH." The sensitivity setting may be set by the humidity sensitivity input mechanism 26 and may be programmed into the control 10. For example, the "LOW," "MED," and "HIGH" settings of the selectable sensitivity input mechanism 26 may correspond to a respective low sensitivity of the control in response to a detected change of the humidity, a medium sensitivity of the control in response to a detected change of the humidity, and a high sensitivity of the control in response to a detected change of the humidity. For example, the control may contain logic in which (depending upon the particular mode set by the user), generally, the "LOW" sensitivity setting requires a relatively large rapid change in relative humidity for the control 10 to automatically activate the ventilation mechanism, the "MED" humidity sensitivity setting requires a relatively intermediate/moderate change in relative humidity for the control 10 to automatically activate the ventilation mechanism, and the "HIGH" humidity sensitivity setting requires a relatively small slow change in relative humidity for the control 10 to automatically activate the ventilation mechanism 12. The "LOW," "MED," and "HIGH" settings may correspond to discrete values or levels, or each of the "LOW," "MED," and "HIGH" settings may correspond to a range of values as described further below. Further, the "OFF" indication of the selectable humidity sensitivity input mechanism 26 may instruct the control 10 (i.e., the logic contained therein) to not consider (e.g., rendering void) a detected f change of humidity in determining if the ventilation mechanism 12 (FIG. 1) should be automatically activated or deactivated. In this way, the "OFF" setting of the humidity sensitivity input mechanism 26 may eliminate the size and/or rate of change of relative humidity as a factor affecting the determination of control 10 (FIG. 1) automatically activating or deactivating the ventilation mechanism 12 (FIG. 1). As explained further below, if a user utilizes the selectable sensitivity input mechanism 26 to select a sensitivity setting other than "OFF," certain modes of operation of the control 10 (FIG. 1) are available to the user (and selectable via the other input mechanisms of the interface 22) and the rate of change of relative humidity may be utilized as a factor affecting the determination of whether the control automatically activates and/or deactivates the ventilation mechanism. The humidity sensitivity input mechanism 26 thereby allows the user to select or input how the control 10 (FIG. 1) responds (i.e., activates or deactivates the ventilation mechanism) to a change in relative humidity. Such a feature may be advantageous as users in areas with low ambient relative humidity may need large/rapid changes in relative humidity to trigger activation of the ventilation mechanism to effectively manage the relative humidity of the area, while users in areas with high ambient relative humidity may need small/slow changes in relative humidity to trigger activation of the ventilation mechanism to effectively manage the relative humidity of the area as high humidity events (e.g., showers or baths) will cause smaller changes in ambient relative humidity in such high ambient relative humidity areas.

The control 10 (FIG. 1) and/or the selectable humidity sensitivity input mechanism 26 may be operable or configured such that a user can utilize the selectable humidity sensitivity input mechanism 26 to select between a range of sensitivity settings between or about the visually indicated or marked "LOW," "MED," and "HIGH" settings. The selectable humidity sensitivity input mechanism 26 may be a trim potentiometer or other similarly utilized mechanism, and the position of the mechanism 26 with respect to the "LOW", "MED," and "HIGH" indications corresponds to a user selected relative programmed humidity sensitivity setting (i.e., the selectable humidity sensitivity input mechanism 26 provides for more than three discrete substantive humidity sensitivity settings).

With reference again to FIG. 3, the control 10 may be operable or configured such that the selectable settings of the selectable humidity sensitivity input mechanism 26 (e.g., LOW, MED, HIGH sensitivity setting and, potentially, settings, therebetween) correspond to relative rates of change of relative humidity and/or fixed relative humidity thresholds/set-offs. The user selectable rates of change in relative humidity and/or thresholds/set-offs (i.e., humidity sensitivity settings) may be utilized, depending upon the user selected mode of the control 10. The logic of the control 10 using the user selected sensitivity level, may be operable to determine whether the ventilation mechanism 12 should be automatically activated or deactivated. A particular user selected sensitivity setting that is set by the selectable sensitivity input mechanism 26, which is constant and independent of ambient conditions, may work well for some environmental conditions.

However, humidity levels of an area may change significantly over time, a user selected, dynamically changing humidity sensitivity level may improve performance of the control 10 in managing relative humidity of the area via the ventilation mechanism 12. The sensitivity input mechanism 26 may include a dynamically variable sensitivity configuration, such that the sensitivity settings thereof correspond to, e.g., ranges of change/rates of change in relative humidity. A user may retain the ability to set their overall or general desired level of humidity sensitivity level, but the level can be modified by the control 10 within the corresponding range of sensitivities (e.g., rates of change in relative humidity and/or relative humidity thresholds/set-offs). For example, the control 10 may be operable or configured to modify or choose a predetermined change/rate of change in relative humidity utilized by the logic of the control 10 based on prevailing ambient conditions of the area. Dynamic sensitivity level settings of the selectable sensitivity input mechanism 26 may provide the control 10 with the capacity to adjust to the prevailing conditions and recognize a high humidity event (e.g., a shower) as a trigger for activating the ventilation mechanism 12 even in the presence of high humidity. Specifically, in such prevailing conditions, the control 10 may be operable or configured to choose a particular humidity sensitivity level that falls within the high end of the "LOW" humidity sensitivity level range (e.g., a level that requires a slightly smaller change and/or less rapid change in humidity). In this way, the control 10 may be operable or configured to choose or adjust the specific humidity sensitivity level, within the parameters chosen or input by the user, that is utilized by the logic in determining whether the ventilation mechanism 12 should be automatically activated or deactivated (as described further below).

With reference to FIG. 2, the selectable humidistat input mechanism 28 may be operable to select from, or input, any number of relative humidity values and modes of the control 10. The control 10 may be operable or configured, in mode, such that the user input or set relative humidity value setting limits the ventilation mechanism 12 from activating only when the relative humidity detected by the humidity sensor 18 is above the input or set relative humidity value setting, e.g. the humidistat input mechanism may prescribe a humidity threshold below which the control 10 operates in 1 manual on/off mode.

As shown in FIGS. 1 and 3, the selectable humidistat input mechanism 28 may include one or more discrete selectable humidity value or level setting indications corresponding to the limits of the humidity value or level settings available to the user. For example, a user may engage the selectable humidistat input mechanism 28 and select between, or otherwise input, a humidity value corresponding with a visual and/or tactile indication on the interface 22 and/or the selectable humidistat input mechanism 28. In the exemplary embodiment of FIG. 3, the interface 22 includes two humidity value or level settings for the selectable humidistat input mechanism 28 visually indicated by "20" and "80," however it will be understood by one of ordinary skill in the art that any number of selectable humidity value or level settings may be used and the level setting(s) may be of any value. Furthermore, it should be readily understood that the user could select from a complete range of valves between and beyond these indicated on the humidistat input mechanism 28. The user selectable humidity values or level settings associated with the selectable humidistat input mechanism 28 may be programmed into the control 10 (e.g., saved into memory 18). For example, the "20" and "80" setting indications of the selectable humidistat input mechanism 28 may correspond to relative humidity values or levels of 20% and 80%, respectively, and may define the lower and upper limits of a range of humidity values or level settings available for selection by the user via the selectable humidistat input mechanism 28. In this way, if the selectable humidistat input mechanism 28 is positioned by the user half way or midway between the "20" and "80" setting indications, the user may input, set or select a humidity value or level limit setting of about 50% relative humidity.

The control 10 may be operable or configured such that when the selectable humidistat input mechanism 28 inputs a relative humidity value or level within the lower and upper limits of the humidity values or levels available for selection, the control 10 may be operable or configured to operate in a mode that utilizes a sensed relative humidity of the atmospheric sensor 20 as criteria (i.e., utilized in logic) for determining whether the control 10 automatically activates or deactivates the ventilation mechanism 12 at a particular point in time.

The selectable humidistat input mechanism 28 may also provide for the selection of other modes of operation of the control 10 in which relative humidity sensed or detected by the atmospheric 20 is not utilized as criteria for determining whether the control 10 automatically activates or deactivates the ventilation mechanism 12. For example, the selectable humidistat input mechanism 28 may include an "OFF" setting. The "OFF" setting of the humidistat input mechanism 28 may instruct the control (i.e., the logic contained therein) to operate in a mode in which the control does not consider (e.g., renders void or ignores) a sensed or detected relative humidity value or level from the atmospheric 20 in determining if the ventilation mechanism should be activated or deactivated. In this way, the "OFF" setting of the humidistat input mechanism 28 may set the control in one or more modes (e.g., depending upon the selection or input of the selectable humidity sensitivity input mechanism 26) that eliminates the relative humidity level or value as criteria for determining whether the control activates or deactivates the ventilation mechanism.

The selectable humidistat input mechanism 28 may include an "AIR CYCLE" setting. The "AIR CYCLE" setting of the humidistat input mechanism 28 may instruct the control 10 (i.e., the logic contained therein) to operate in an air cycle mode (e.g., regardless of the selection or input of the selectable humidity sensitivity input mechanism 26) in which the control does not consider (e.g., renders void or ignores) a detected relative humidity value or level in determining when/if the ventilation mechanism should be turned activated or deactivated, as described further below.

The interface 22 may include engageable manual command mechanism 30. The command mechanism 30 may be operable or configured to enable a user to manually set, initiate, cease or otherwise manually command the control 10 to operate (or stop operating) in a particular mode, setting or the like, as explained further below. The command mechanism 30 may be an on/off switch or a push pad arrangement or mechanism. The command mechanism 30 may be operable or configured to return to a neutral arrangement or position after it is manually actuated or utilized by a user.

As explained above, the control 10 may be operable or configured to operate in one of a plurality of modes, and such modes may be controlled by a user based on the user settings, selections or inputs, such as via the selectable time input mechanism 24, selectable humidity sensitivity input mechanism 26, selectable humidistat input mechanism 28 and, potentially, the command mechanism 30. In the exemplary embodiment shown in FIG. 3, the control 10 is operable or configured to operate in one or more auto modes, a humidistat mode, an air cycle mode, and a timer mode. Each mode of the control 10 commands, controls or otherwise manages activation and deactivation of the ventilation mechanism 12 according to different logic schemes to suit a particular need or desire of the user and/or the environmental conditions (e.g., relative humidity, temperature, etc.) of the area being managed by the control 10 and the ventilation mechanism. From the present description, it will be appreciated that the interface may include a display screen and one or more buttons operable for entering or setting one or more of the above noted inputs.

A first auto mode of the control 10 may be input, set, initiated or otherwise selected by a user by inputting or selecting a substantive relative humidity setting of the selectable humidistat input mechanism 28 (i.e., a setting other than "OFF," such as "20%," "80%," or any setting therebetween), selecting a substantive humidity sensitivity setting or value (i.e., a setting other than "OFF," such as a "LOW," "MED," or "HIGH" setting) of the selectable humidity sensitivity input mechanism 26, and any substantive (i.e., not an "OFF" setting, if available) of the selectable time input mechanism 24. In the first auto mode of the control 10, the control 10 may be operable or configured to automatically activate and/or deactivate the ventilation mechanism 12 based on logic or one or more algorithms programmed into the control 10, such as stored in the memory 18 thereof.

The control 10 may be operable or configured such that when set in the first auto mode by a user via the interface 22, the control 10 automatically activates (e.g., turns "on") the ventilation mechanism 12 based on, at least partially, the humidity information provided by the humidity sensor; e.g. based at least partially on temperature, humidity, time of day etc., or changes/rates in such parameters.

The control 10 may be operable to automatically activate (e.g., turns "on") the ventilation mechanism 12 based on, at least partially, a change/rate of change in the humidity level (e.g., a rate of change in a rise in the humidity level) as affected by the sensitivity level input by the user via the selectable humidity sensitivity input mechanism 26. The control 10 may be operable to automatically activate (e.g., turns "on") the ventilation mechanism 12 based on, at least partially, a relative humidity level that is about or above the relative humidity level input by the user via the selectable humidistat input mechanism 28.

The control 10 may determine the change (e.g. increase/decrease) in relative humidity by, at least in part, receiving information about the change in relative humidity from the atmospheric sensor 20. The control 10 may determine the change n relative humidity by, at least in part, receiving two or more readings of relative humidity information from the atmospheric sensor 20 and calculating or otherwise utilizing the information to determine the change in relative humidity level.

The control 10 may determine a rate of change in the relative humidity level (e.g., rate of increase/decrease in humidity) by, at least in part, receiving information about the rate of change in the relative humidity level information from the atmospheric sensor 20. The control 10 may determine the rate of change in the relative humidity level by, at least in part, receiving two or more readings of relative humidity information from the atmospheric sensor 20 over a period of time and calculating or otherwise utilizing the information to determine the rate of change in the relative humidity level.

As described above, the control 10 may be configured or operable such that the sensitivity level input by the user via the selectable sensitivity input mechanism 26 is "dynamic" such that the input relative humidity sensitivity level corresponds to a range of sensitivity values. The control 10 may be configured or operable such that the control 10 utilizes a sensitivity level within the range of sensitivity values that, based on relatively recent sensor readings, e.g., temperatures humidity levels etc. sensed by the atmospheric sensor 20, increases the likelihood that a) high humidity events will trigger or result in automatic activation of the ventilation mechanism 12; and b) only high humidity events trigger or result in automatic activation of the ventilation mechanism 12 (i.e., environmental conditions do not trigger automatic activation).

Figure 4:
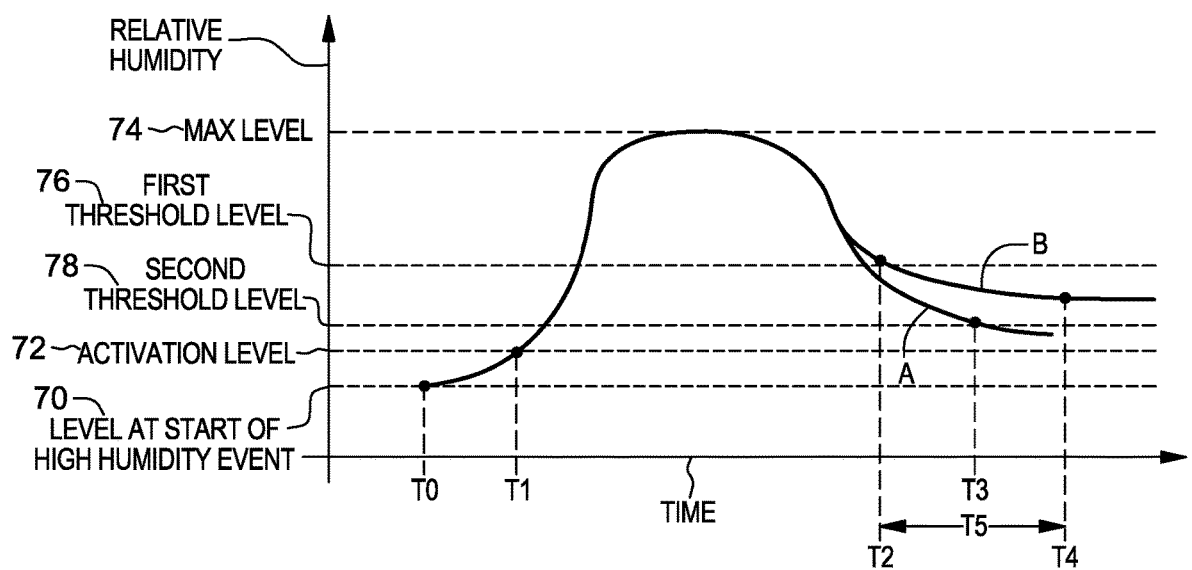
FIG. 4 is a graph depicting relative humidity levels of an area over time as managed by the ventilation system of FIG. 1.

With reference to FIG. 4, the control 10 (FIG. 1) may be operable or configured such that when set in the first auto mode by a user via the interface 22 (FIG. 1), the control automatically deactivates (e.g., turns "off") a previously activated ventilation mechanism by utilizing (e.g., with or one or more algorithms programmed into the control) sensed atmospheric conditions, e.g., relative humidity information from the sensor 20 (FIG. 1) and the time value input set by the user via the selectable time input mechanism 24.

The control may be operable or configured to automatically deactivate or turn off the ventilation mechanism when the control determines:
   a) the expiration of the time value input set by the user via the selectable time input mechanism 24 (FIG. 2), e.g. determined with respect to a time measured beginning from for example a time T1 such as the start of the activation of the ventilation mechanism 12;
   b) a relative humidity level sensed by the sensor 20 (FIG. 1) is about or less than a first threshold relative humidity level 76; and
   c) the sensed relative humidity level is either:
      i) less than a second threshold relative humidity level 78 (e.g., at a time T3 of line segment "A" in FIG. 4); or
      ii) between the first threshold relative humidity 76 and the second threshold relative humidity levels 78 (e.g., time T4 of line segment "B" in FIG. 4).

In operation, the control 10 continuously samples the environment by taking atmospheric readings of the environment using sensor 20. Based on programmed actuation logic, utilizing the various user input settings, the control 10 may activate the ventilation mechanism at time T1 and activation level 72 corresponding to a measured RH. The control 10, when operating in automatic mode, will then continue to monitor atmospheric conditions and determine when the ventilation mechanism should be deactivated. The control 10's deactivation programming logic in one embodiment can use the user's time input setting to prescribe a minimum activation time for the ventilation mechanism. Based on the time input setting, once activated the ventilation mechanism will remain activated for at least the amount of time indicated by the time input setting. Once the control 10 determines that the minimum amount of time has expired, it next evaluates whether the remaining deactivation requirements have been satisfied. If the control 10 determines that the currently sensed RH is at or below the second threshold Level 78 once the minimum time has expired, then the control 10 will deactivate the ventilation mechanism. If this condition is not met, the control 10 then proceeds to monitor the RH and records the time at which the RH drops to a first threshold level 76, which may be a function of the activation level 72, max level 74 and/or the start level 70. The control 10 continues to monitor the RH for a period of time T5. If the currently sensed RH drops to less than or equal to the second threshold level 78, then the control 10 deactivates the ventilation mechanism at T3. Otherwise, the control 10 deactivates the ventilation mechanism after time period T5 has expired regardless of the level of the currently sensed RH. Effectively, the control 10 determines that if after time T5, which is measured from when the currently sensed RH drops to the first threshold level 76, the RH has not dropped to the second threshold level 78 or less, it is inefficient to continue operating the ventilation mechanism since the humidity level is not effectively dropping any further.

The start relative humidity level 70 at the start time TO is the relative humidity sensed by the sensor 20 generally prior to a beginning of a rise in the humidity level. For example, generally prior to and at T0 the ambient humidity of an area may have relatively small and slow changing humidity levels, e.g., certain predetermined time periods; e.g. the controller may operably monitor the ambient humidity in, for example, 5 second intervals.

The activation humidity level 72 at T1 is the relative humidity sensed by the atmospheric sensor 20 generally after a relatively larger rise in the humidity level compared to the relative smaller ambient changes in humidity level. For example, the controller operably monitoring the ambient humidity in, for example, 5 second intervals, may determine a relatively greater and faster changing humidity level compared to a prior interval, thereby (provided any other conditions are met, e.g., above the selected humidity level setting) triggering activation of the ventilation mechanism.

As shown in FIG. 4, the first threshold relative humidity level 76 may be a humidity value between the start relative humidity level 70 that is sensed at the start time T0 and a maximum relative humidity level 74 that is sensed by the sensor after the start time T0. The first threshold relative humidity level 76 is the midpoint between the start relative humidity level 70 that is sensed by the sensor at the start time T0 and a maximum relative humidity level 74 that is sensed by the sensor after the start time T0. For example, the first threshold relative humidity level 76 may be selected as the average of relative humidity levels from the start relative humidity level 70 to the maximum relative humidity level 74 or even some percentage from the start or maximum relative humidity levels, 70 or 74, respectively. As can be appreciated, the first threshold level may be selected as a function of one or more of the start activation and/or maximum relative humidity levels.

The second threshold relative humidity level 78 is determined by the control through, or by way of, logic programmed into the control (e.g., stored in memory) using the humidity values sensed by the humidity sensor and on the first threshold level. For example, the second threshold relative humidity level 78 is a humidity level value that is based upon, or at least related to, the start relative humidity level 70 that is sensed by the sensor at the start time T0. For example, the second threshold relative humidity level 78 is a humidity level value that is a percentage of the start humidity level 70 that is sensed by the sensor at the start time T0. The second threshold relative humidity level 78 may be about 110% of the start humidity level 70. It should be appreciated that the second threshold level, similar to the first threshold level, may be selected as a function of one or more of the start, activation, max and/or first threshold levels.

As shown by the line segment "A" in FIG. 4, the control may be operable or configured such that when the control determines the ventilation mechanism should be deactivated because the sensed relative humidity level is less than the second threshold relative humidity level 78, the control may be operable or configured to deactivate the ventilation mechanism at the time T3 when the sensed relative humidity level is first determined, detected or sensed to be less than or equal to the second threshold relative humidity level 78.

As shown by the line segment "B" in FIG. 4, the control may be operable or configured such that when the control determines the ventilation mechanism should be deactivated at time T4 because the sensed relative humidity level is between the first and second threshold relative humidity levels 76, 78 and the declining level timeout period T5 has expired. For example, as shown in FIG. 4 the declining level timeout period T5 may be a fixed period of time programmed into the control, such as saved in the memory of the control that extends (i.e., runs) from the time T2 when the sensed relative humidity level is first determined, detected or sensed to be equal to or less than the first threshold level levels 76, (and expires at time T4, when the control deactivates the ventilation mechanism). The declining level timeout period T5 expires at a time T4 that is about ten minutes from the time T2 when the sensed relative humidity level is first determined to be between the first and second threshold relative humidity levels 76, 78. The control 10 may be operable or configured to keep the ventilation mechanism 12 activated despite the timeout period at having expired, if detected changes in the humidity level are generally large. When the humidity changes are generally small, this timeout will expire, and the ventilation mechanism 12 will be deactivated. Advantageously this allows the control 10 to determine whether the ventilation mechanism is efficiently operating and continuing to reduce the humidity level by an adequate amount.

Figure 5:
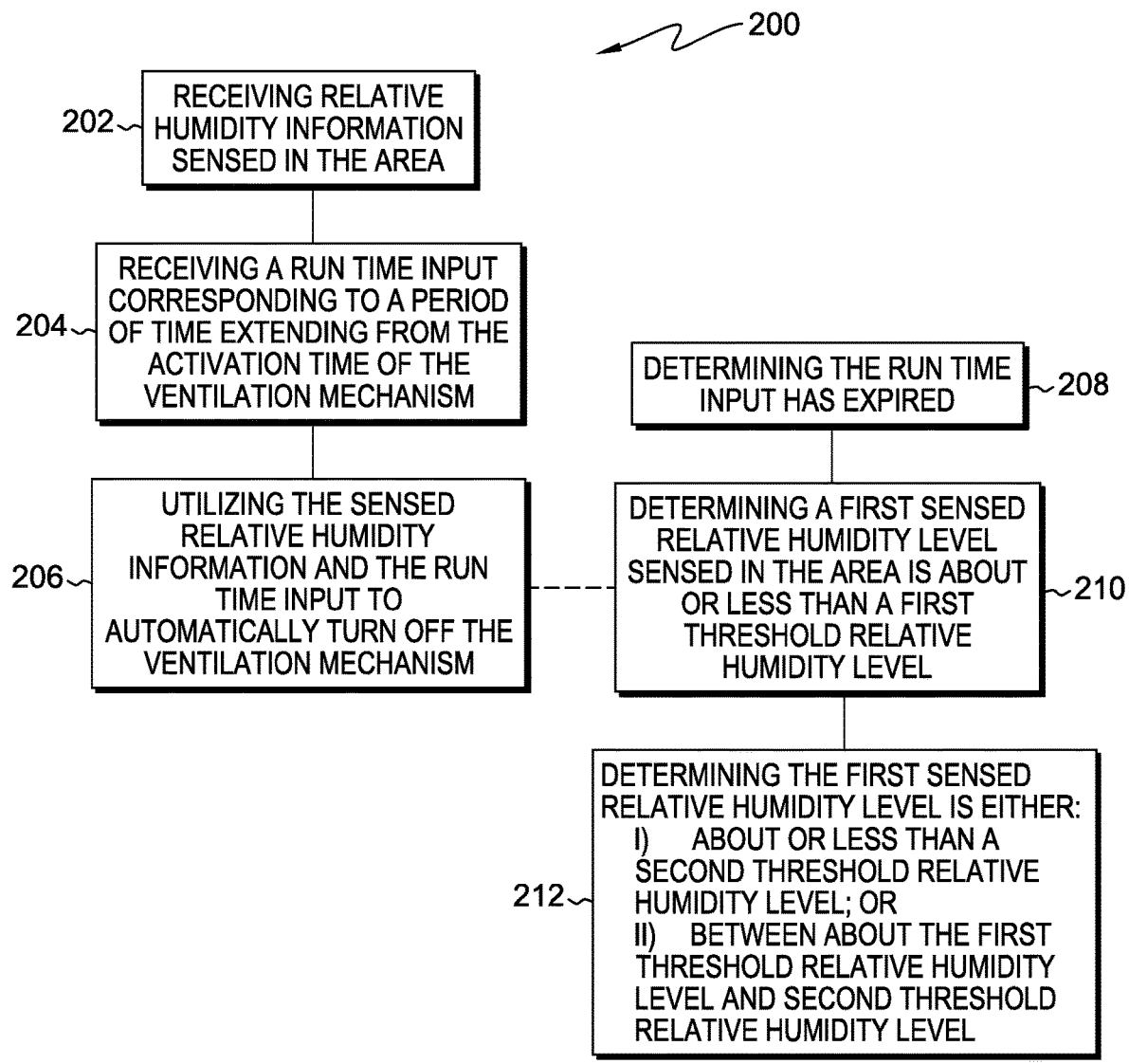
FIG. 5 is a flowchart of an exemplary embodiment of a method for deactivating or turning off the ventilation system of FIG. 1.

As depicted in FIG. 5, a method 200 for automatically turning off a ventilation mechanism that was turned on at an activation time to manage relative humidity in an area is depicted. The method 200 may include a control receiving sensed relative humidity information sensed in the area 202 and receiving a runtime input. The control may receive a run time input corresponding to a period of time extending from the activation time of the ventilation mechanism 204. As shown in FIG. 5, the method 200 may then include utilizing the sensed relative humidity information and the run time timeout period input to automatically turn off the ventilation mechanism 206; e.g., a countdown fan timer, a ventilation timer, or the like.

As also shown in FIG. 5, the method 200 may include determining that the run time timeout period input has expired 208. In such an embodiment of the method 200, may include turning off the ventilation mechanism 206 appear the timeout period has expired if determining the first sensed relative humidity level sensed in the area is about or less than a first threshold relative humidity level 210. Alternatively, the method 200 may turn off the ventilation mechanism 206 determining that the first sensed relative humidity level is either: i) about or less than a second threshold relative humidity level; or ii) between about the first threshold relative humidity level and second threshold relative humidity level 212 after the timeout period has expired.

The control may be operable or configured to include manual operation or manual override of the control when the control is set in the first auto mode. For example, the control may be operable or configured such that when set in the first auto mode via the interface and the ventilation mechanism is deactivated (i.e., turned "off"), user actuation or operation of the manual command mechanism 30 will manually activate (i.e., turn "on") the ventilation mechanism 12 for the time value input by the user via the selectable time input mechanism 24. Additionally, the control 10 may be operable or configured such that if at or before the expiration of the time value (initiated by actuation of the manual command mechanism 30) the control 10 automatically determines whether the ventilation mechanism 12 should be activated (e.g., via the logic described above), the first auto mode of the control 10 may control or take over and keep the ventilation mechanism 12 activated until the control automatically determines the ventilation mechanism 12 should be deactivated (e.g., according to the logic described above). Similarly, if the ventilation mechanism 12 has been manually turned on via user actuation or operation of the manual command mechanism 30, and the first auto mode of the control 10 "agrees" and determines the ventilation mechanism 12 should be on, the control 10 may ignore a subsequent actuation or operation of the manual command mechanism 30 to manually turn-off the ventilation mechanism 12 (i.e., the first auto mode of the control 10 may ignore the manual command mechanism 30 and keep the ventilation mechanism 12 activated until the logic of the control 10 determines the ventilation mechanism 12 should be deactivated).

The control 10 may be operable or configured such that when set in the first auto mode via the interface 22 and the ventilation mechanism 12 is activated (i.e., turned "on") according to the logic described above, user actuation or operation of the manual command mechanism 30 may manually deactivate (i.e., turn "off") the ventilation mechanism 12 (i.e., disable the automatic activation of the first auto mode of the control 10). The control 10 may be operable or configured such that user actuation of the manual command mechanism 30 will deactivate the ventilation mechanism 12 for a length of time equal to the time value input by the user via the selectable time input mechanism 24. Alternatively, the control 10 may be operable or configured such that user actuation of the manual command mechanism 30 deactivates the first auto mode of the control 10. The first auto mode may be manually deactivated by the operation of the manual command mechanism 30 until the logic of the first auto mode determines the ventilation mechanism 12 should be turned off (i.e., the first auto mode agrees that the ventilation mechanism 12 should be deactivated). Once the logic of the first auto mode agrees with the manual deactivation of the ventilation mechanism 12, the manual override of the first auto mode of the control 10 (via actuation of the manual command mechanism 30) may be canceled or concluded and the automatic operation of the first auto mode may prevail, take over or otherwise control the control 10 thereafter.

The first auto mode of the control 10 may be operable or configured to include a short duration high humidity event protection feature that deactivates the ventilation mechanism 12 before the expiration of the time value input by the user via the selectable time input mechanism 24. Some short duration high humidity events result in changes in humidity that include sufficient metrics such that the first auto mode automatically activates the ventilation mechanism 12 (e.g., according to the logic described above). However, if the user has input a relatively large time value via the selectable time input mechanism 24, short duration high humidity events may result in the ventilation mechanism 12 being activated longer than is needed to sufficiently ventilate or lower the relative humidity of the treatment area. This could result in the unnecessary or excess activation of the ventilation mechanism 12 resulting in wasted energy and unnecessary ventilation noise. The short duration high humidity event protection feature of the first auto mode of the control 10 may reduce or eliminate the wasted energy and excess ventilation noise when activation of the ventilation mechanism 12 for the entire time value input by the user via the selectable time input mechanism 24 is not necessary.

For example, the short duration high humidity event protection feature of the first auto mode of the control 10 may be operable or configured to deactivate the ventilation mechanism 12 before the expiration of the time value input by the user via the selectable time input mechanism 24 when the automatic mode determines that the ventilation mechanism 12 should be deactivated (e.g., via the logic described above) within a pre-set or programmed amount of time after the immediately previous activation of the ventilation mechanism 12. Stated differently, if within a predetermined amount of time after automatic activation the control 10 determines that the ventilation mechanism could be deactivated, then the short duration high humidity event protection feature of the control 10 may ignore the minimal run time of the ventilation mechanism prescribed by a user via input 24. The deactivation pre-set or programmed time of the short duration high humidity event protection feature of the first auto mode of the control 10 may be hard coded e.g. a fixed amount of time programmed in the control 10. In some other embodiments, the deactivation pre-set time of the short duration high humidity event protection feature of the first auto mode of the control 10 may be related to or based on, at least in part, how high a humidity level sensed by the sensor 20 rises above the ambient level. Additionally, the short protection mode can also be automatically initiated/enabled based on how much the humidity level rises above the ambient level. In some other such embodiments, the deactivation pre-set time of the short duration high humidity event protection feature of the first auto mode of the control 10 may be related to or based on, at least in part, the time value input by the user via the selectable time input mechanism 24; e.g., may be a percentage of the time value input by the user via the selectable time input mechanism 24.

A second auto mode of the control 10 may be input, set, initiated or otherwise selected by a user by inputting or selecting the "OFF" or non-substantive setting of the selectable humidistat input mechanism 28, selecting a substantive humidity sensitivity setting or value (i.e., a setting other than "OFF," such as a "LOW," "MED," or "HIGH" setting) of the selectable humidity sensitivity input mechanism 26, and any substantive (i.e., not an "OFF" setting, if available) of the selectable time input mechanism 24. In the second auto mode of the control 10, the control 10 may be operable or configured to automatically activate and/or deactivate the ventilation mechanism 12 based on logic or one or more algorithms programmed into the control 10, such as stored in the memory 18 thereof, in a substantially similar way as in the first auto mode described above (e.g., in both automatic operation and manual override operation of the control 10).

One difference between the first auto mode and the second auto mode of the control 10 may be the "OFF" or non-substantive relative humidity level input via the selectable humidistat input mechanism 28 by the user. In automatic operation of the control 10 in the second auto mode, the control 10 may be operable or configured (e.g., logic or algorithms(s) programmed therein) to eliminate determining whether a relative humidity level sensed or detected by the atmospheric sensor 20 is above the level input, set or selected by the user via the selectable humidistat input mechanism 28 (as the user has not input or selected a substantive relative humidity level) e.g., operating in a fully automatic mode without an ambient humidity threshold/set-off.

A humidistat mode of the control 10 may be input, set, initiated or otherwise selected by a user by, e.g. inputting or selecting a substantive relative humidity setting of the selectable humidistat input mechanism 28 (i.e., a setting other than "OFF," such as "20%," "80%," or any setting therebetween), selecting the "OFF" or a non-substantive humidity sensitivity setting of the selectable humidity sensitivity input mechanism 26, and any substantive (i.e., not an "OFF" setting, if available) of the selectable time input mechanism 24. In the humidistat mode of the control 10, the control 10 may be operable or configured (e.g., contain logic or one or more algorithms programmed into the control 10) to provide an automatic humidistat function wherein the ventilation mechanism 12 is cycled on or activated when the relative humidity detected by the sensor 18 is above a relative humidity setting input or set by the user via the selectable humidistat input mechanism 28.

Once the control 10 is set or input into the humidistat mode, a user may allow the control 10 to automatically activate and deactivate the ventilation mechanism 12 based on, or in consideration of, at least in part, the detected, sensed or measured relative humidity by the sensor 20. The automatic operation of the control 10 in the humidistat mode may be based on or otherwise operate on one or more time cycles that are programmed into the control. The time cycles of the automatic operation of the control 10 in the humidistat mode may be based on a fixed amount of time, such as a one-hour time cycles.

The control 10 may be operable or configured to provide for automatic operation in the humidistat mode. The operation of the control 10 in the automatic humidistat mode activates or otherwise causes the ventilation mechanism 12 to turn on (i.e., actively ventilate or otherwise lower the relative humidity of the treatment area) when the sensor 20 detects or senses a relative humidity level within the treatment area that is above the user-input or set relative humidity setting of the selectable humidistat input mechanism 28. After automatically activating the ventilation mechanism 12 due to a sensed relative humidity above that input or set by the user via the selectable humidistat input mechanism 28, the control 10 may keep the ventilation mechanism 12 activated or "on" (e.g., a load applied thereto) for the time value input or set by the user via the selectable time input mechanism 24 during the time. The time cycle programmed in the control 10 may be equal to or greater than the largest time value setting available to be input or set by the user via the selectable time input mechanism 24. The control 10 may commence or otherwise start the time cycle associated with the automatic humidistat mode when the ventilation mechanism 12 is activated.

The control 10 is operable or configured to deactivate or otherwise turn off the ventilation mechanism 12 (e.g., no longer apply a load thereto) when the amount of time the ventilation mechanism 12 is active meets or exceeds the time value input or set by the user via the selectable time input mechanism 24. In such an embodiment, the control 10 may be operable or configured to maintain the ventilation mechanism 12 in an "off" state (i.e., deactivated) until any remaining time of the time cycle associated with the automatic humidistat mode expires (i.e., if the input time value is less than the pre-programmed time cycle). Once an initial humidistat cycle has expired and the control 10 remains set in the automatic humidistat mode, the control 10 may be operable or configured to automatically "look" for a sensed relative humidity level above the input or set relative humidity setting of the selectable humidistat input mechanism 28 and, if such a relative humidity value is sensed or detected, initiate a subsequent humidistat cycle (i.e., initiate a time cycle and activate the ventilation mechanism 12). The triggered subsequent automatic humidistat cycle (i.e., the control 10 detects a relative humidity above the relative humidity setting input via the selectable humidistat input mechanism 28) will again activate the ventilation mechanism 12 for the time value input by the user via the selectable humidistat input mechanism 28 and start or initiate the time cycle. In this way, the automatic humidistat mode of the control 10 may be operable or configured to activate the ventilation mechanism 12 during at least a portion of time cycles beginning when the control 10 detects a relative humidity above the relative humidity setting input via the selectable humidistat input mechanism 28.

The control 10 may provide for manual operation or override of the control 10 in the automatic humidistat mode. The control 10 may be operable or configured to allow a user to manually instruct the control 10 to activate the ventilation mechanism 12 when the control is set in the automatic humidistat mode. The control 10 may be operable or configured such that user operation of the manual command mechanism 30 when the control 10 is set in the humidistat mode and the control 10 has not activated the ventilation mechanism 12, is active (i.e., turns "on" 0 the ventilation mechanism 12 for the time value input or set by the user via the selectable time input mechanism 24.

The control 10 may be operable or configured such that user operation of the manual command mechanism 30 when the control 10 is set in the automatic mode humidistat and has already activated the ventilation mechanism 12 (i.e., the ventilation mechanism 12 is "on") deactivates the ventilation mechanism 12 (i.e., turns "off" the ventilation mechanism 12) for the time value input or set by the user via the selectable time input mechanism 24. The system may then revert back to the automatic operation of the humidistat mode once the time valve has expired by "looking" for a sensed relative humidity level above the input or set relative humidity setting of the selectable humidistat input mechanism 28.

An air cycle mode of the control 10 may be input, set, initiated or otherwise selected by a user by inputting or selecting the "AIR CYCLE" setting of the selectable humidistat input mechanism 28, and any substantive time value (i.e., not an "OFF" setting, if available) of the selectable time input mechanism 24. The control 10 may be operable or configured such that if the "AIR CYCLE" setting of the selectable humidistat input mechanism 28 is input by the user (along with any substantive time value of the selectable time input mechanism 24), the control 10 may operate in the air cycle mode regardless of the setting of the selectable humidity sensitivity input mechanism 26.

The air cycle mode of the control 10 may be operable or configured (e.g., contain logic or one or more algorithms programmed into the control 10) to provide ventilation of the treatment area via the ventilation mechanism 12 for a set period of time per a cycle time programmed into the control 10 (e.g., a predetermined cycle time specified by a user or pre-set at the factory). The predetermined cycle time programmed in the control 10 associated with the air cycle mode may be equal to or greater than the largest time value available to be input or set by the user via the selectable time input mechanism 24. The control 10 may commence or otherwise start the time cycle associated with the air cycle mode when the ventilation mechanism 12 is activated.

The control 10 may be operable or configured such that manual actuation of the manual command mechanism 30 is necessary to activate or initiate the air cycle mode. The control 10 may be operable or configured such that when the interface 22 inputs, sets, initiates or otherwise selects the air cycle mode (as described above, for example), the control deactivates or otherwise turns "off" the ventilation mechanism 12 if the ventilation mechanism 12 is active (i.e., activated, running or otherwise "on") and initiates the air cycle mode.

When the control 10 is set into the air cycle mode via the interface 12, manual actuation of the manual command mechanism 30 may commence or otherwise start the time cycle associated with the air cycle mode and activate (i.e., turns "on") the ventilation mechanism 12 for the time value input by the user via the selectable time input mechanism 24. After activation of the ventilation mechanism 12 via the air cycle mode, the control 10 may be operable or configured to maintain or keep the ventilation mechanism 12 activated until the time value input by the user via the selectable time input mechanism 24 expires or the user manually actuates the manual command mechanism 30. Once the time value input by the user via the selectable time input mechanism 24 expires or the user manually actuates the manual command mechanism 30, the control 10 may be operable or configured to deactivate the ventilation mechanism 12.

When the control 10 deactivates the ventilation mechanism 12 during the air cycle mode due to the expiration of the time value input by the user via the selectable time input mechanism 24 (i.e., the manual command mechanism 30 was not actuated), the control 10 may be operable or configured to maintain the ventilation mechanism 12 in a deactivated or "off" state until the remaining time of the time cycle associated with the air cycle mode expires (i.e., if the input time is less than the time cycle). Thereafter, the air cycle mode of the control 10 may automatically continue (e.g., if the user does not change pertinent inputs via the interface 22) by performing another phase or sequence of the ventilation mechanism 12 being activated for the time value input by the user for the predetermined cycle time associated with the air cycle mode, and then the ventilation mechanism 12 being deactivated for the remaining time of the predetermined cycle time. In this way, the air cycle mode will perform cycles of activating the ventilation mechanism 12 for a portion of the predetermined cycle time associated with the air cycle mode, and deactivating the ventilation mechanism 12 for the remaining portion of the predetermined cycle time. Stated differently, the air cycle mode of the control 10 may be operable to automatically activate the ventilation mechanism for the period of time corresponding to the run time input of the time selectable time input mechanism 24 during consecutively repeating predetermined cycle time periods programmed into the control 10. The control 10 may include a visual or tactile indication, such as on the interface, when operating in the air cycle mode (i.e., after the manual command mechanism 30 has been actuated and the time cycle is counting down). It should also be appreciated that the predetermined cycle time could be a variable time and depend, e.g., on time of day or sensed humidity.

The control 10 may be operable or configured such that when in the air cycle mode, manual actuation of the manual command mechanism 30 by the user while the ventilation mechanism 12 is activated (i.e., "on") cancels the air cycle mode (i.e., actuation of the manual command mechanism 30 would be required to restart the air cycle mode). The control 10 may be operable or configured such that when in the air cycle mode, manual actuation of the manual command mechanism 30 by the user while the ventilation mechanism 12 is deactivated (i.e., "off") initiates the cycle time and activates the ventilation mechanism 12 for the time value input by the user via the selectable time input mechanism 24 (i.e., starts a cycle time and activates the ventilation mechanism 12)

The timer mode may be input, set, initiated or otherwise selected by a user inputting or selecting the "OFF" or a non-substantive humidity setting of the selectable humidistat input mechanism 28, the "OFF" or a non-substantive humidity sensitivity setting of the selectable humidity sensitivity input mechanism 26, and any substantive time value (i.e., not an "OFF" setting, if available) of the selectable time input mechanism 24. The timer mode of the control 10 may be operable or configured (e.g., contain logic or one or more algorithms pre-programmed into the control 10) to operate as a countdown timer for the activation time (i.e., "on" time) of the ventilation mechanism 12. Stated differently, the timer mode of the control 10 may operate the ventilation mechanism 12 only for a time period equal to the time value input by the user via the selectable time input mechanism 24. The control 10 may be operable or configured such that when the control 10 is set or input into the timer mode via the interface 22, manual actuation of the manual command mechanism 30 will activate the ventilation mechanism 12 (i.e., turn "on" the ventilation mechanism 12) for the time value input by the user via the selectable time input mechanism 24. After the expiration of the time value input by the user via the selectable time input mechanism 24, the control 10 may deactivate the ventilation mechanism 12 and only reactivate the ventilation mechanism 12 if the manual command mechanism 30 is subsequently actuated. The control 10 may be operable or configured such that when set in the timer mode and the ventilation mechanism 12 is activated (i.e., turned "on"), subsequent actuation of the manual command mechanism 30 will deactivate (i.e., turn "off") the ventilation mechanism 12.

The control 10 may include one or more aspects thereof being operably coupled or in communication with an occupancy sensor that is operable or configured to automatically control the activation and deactivation of an illumination mechanism. The combination of the atmospheric sensor 20 and the occupancy sensor may provide improved performance over a standard occupancy sensor by utilizing the relative humidity information as an additional indication that an area is occupied (and therefore the determination that the illumination mechanism should be, or remain, activated).

Figure 6:
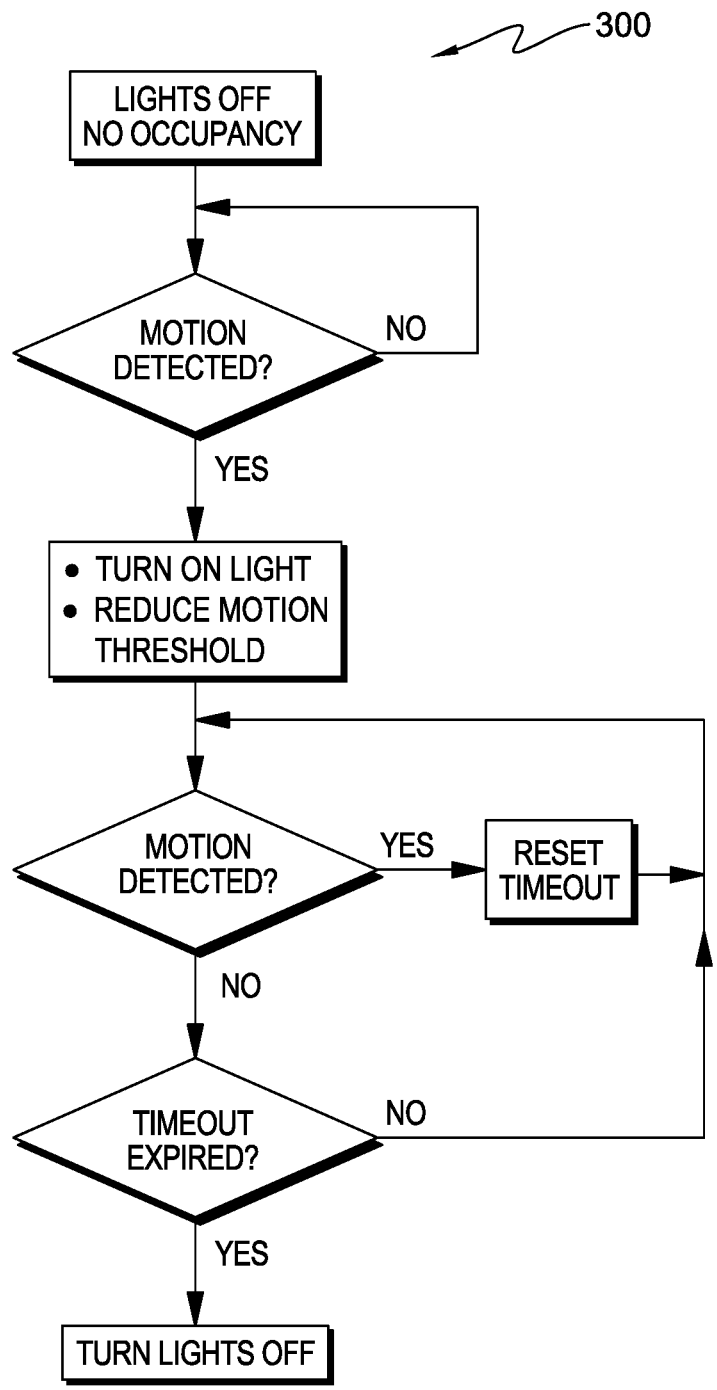
FIG. 6 is a flowchart depicting the use of a prior art occupancy sensor illumination mechanism control.

As shown in FIG. 6, a prior art method 300 in connection with illumination or lighting occupancy sensor is commonly used in areas, such as areas that are subjected to high humidity events (e.g., bathrooms or shower stalls), to control the activation and deactivation of illumination mechanism in the area. At a basic level, occupancy sensors are operable or configured to automatically activate illumination mechanism when motion/infrared is detected within a monitored area and deactivate the illumination mechanism when motion/heat is no longer detected within the monitored area, as shown in FIG. 6. Standard occupancy sensors commonly fail, however, by deactivating the illumination mechanism while a user or occupant is present within particular sections of the area that the occupancy sensors cannot "see" or effectively sense or detect the occupant. For example, passive infrared occupancy sensors require line of sight to detect an occupant in relation to the sensor. In many bathrooms, there is a shower curtain or shower door that effectively blocks the line of sight needed for passive infrared occupancy sensors to properly detect occupancy. As a result, in these situations the standard occupancy sensor will improperly or incorrectly deactivate (i.e., turn "off") the illumination mechanism controlled by the occupancy sensor while the user/occupant is within the shower.

One option to overcome the failure of standard occupancy sensors to properly detect occupancy is to increase the delayed off time or timeout period of the illumination mechanism a sufficient amount that ensures the illumination mechanism stays activated for a time period long enough for the user/occupant to complete their activity within the area (e.g., complete a shower), as illustrated in FIG. 6. This scheme, however, can lead to increase energy use by the illumination mechanism when there is no shower or other high humidity event taking place (i.e., no user/occupant present but "hidden" within the area). Another option to overcome the failure of standard occupancy sensors to properly detect occupancy is by using occupancy sensing or detecting technology other than passive infrared technologies, such as ultrasonic detection. While some alternative technology schemes may be effective, they are typically impractical due to relatively high costs.

Figure 7:
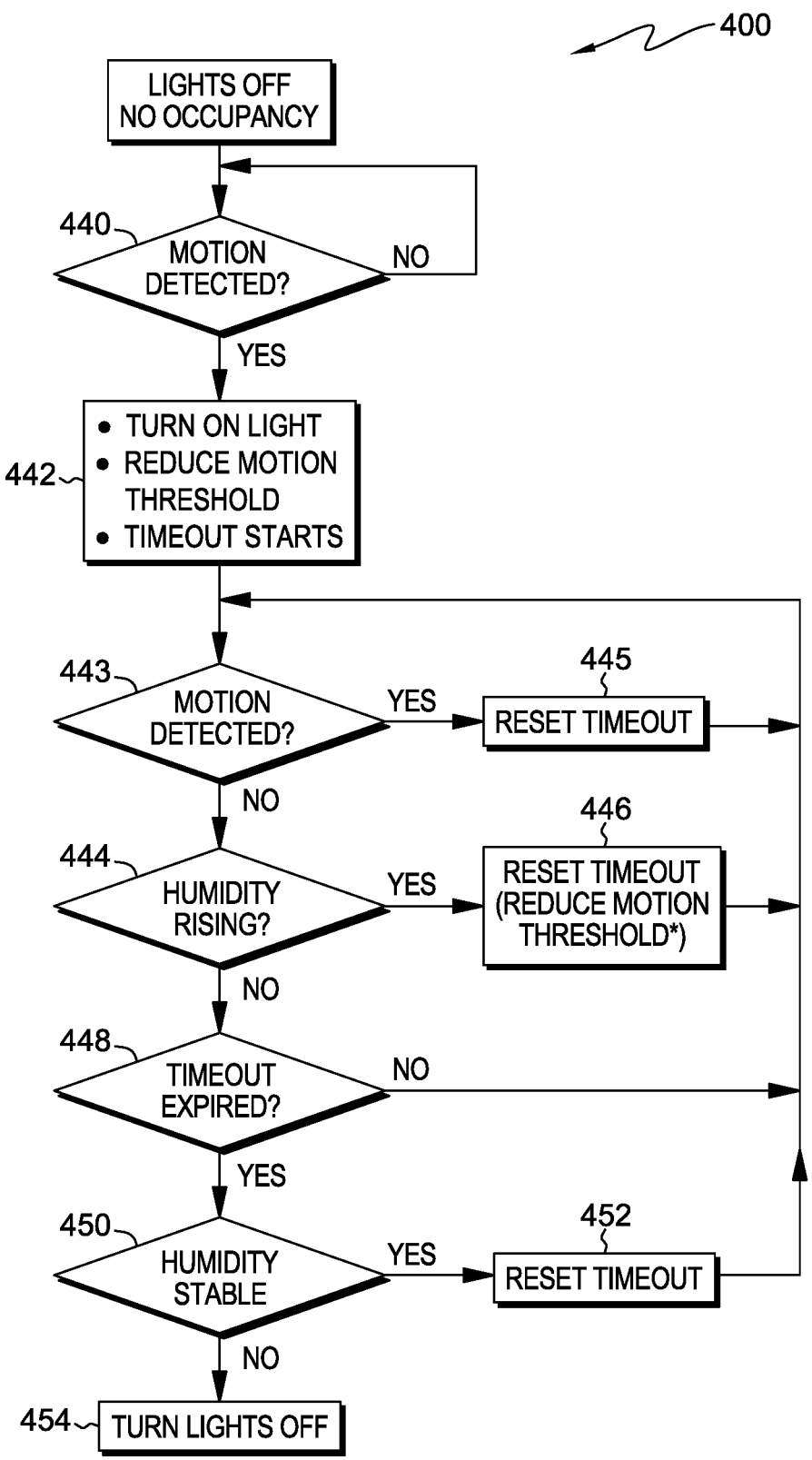
FIG. 7 is a flowchart depicting the use of an exemplary occupancy and humidity sensor illumination mechanism control in accordance with an exemplary embodiment of the present disclosure.

As shown in FIG. 7, a method 400 in connection with an improved occupancy sensor/control may be operable or configured such that the sensor 20 of the control 10 provides an additional input to the logic or algorithm of the improved occupancy sensor/control to more accurately and efficiently control at least the deactivation of illumination mechanism controlled by the occupancy sensor/control. As shown in FIG. 7, the logic or algorithm of the improved occupancy sensor/control may activate 442 the illumination mechanism by utilizing motion information (i.e., if motion is detected) 440. If motion is detected 440 by the motion sensor of the occupancy sensor/control, a motion threshold thereof may be reduced 442 and a countdown timer or timeout may be started 442 or initiated. The timeout may be a period of time programmed into the occupancy sensor/control (e.g., saved into memory 18 of control 10) either predetermined at the factory or set by a user.

After the illumination mechanism is activated 442 by the occupancy sensor/control, the occupancy sensor/control may further monitor an area, and if motion is detected, the timeout period is reset 445 to extend the amount of time the illumination mechanism remains activated and continue to monitor the area for motion. If, however, the occupancy sensor/control does not sense motion, the occupancy sensor/control may utilize relative humidity information from the sensor 20 of the control 10 to determine whether the illumination mechanism should remain activated. For example, in the exemplary illustrated embodiment in FIG. 7, the occupancy sensor/control may be operable or configured to receive relative humidity information from the sensor 20 and determine 444 if the sensed relative humidity is rising. If the occupancy sensor/control determines 444 the relative humidity information from the sensor 20 indicates a rise in relative humidity (e.g., because a high humidity event, such as a shower, is taking place), the occupancy sensor/control may be operable or configured to reset 446 the timeout period to extend the amount of time the illumination mechanism remains activated, monitor the area to sense motion, and, potentially, reduce 446 the motion threshold of the motion sensor of the occupancy sensor/control.

As shown in FIG. 7, if the occupancy sensor/control determines 444 that the relative humidity information from the sensor 20 does not indicate a rise in relative humidity (e.g., because a high humidity event is not taking place), the occupancy sensor/control may be operable or configured to determine 448 if the timeout period has expired. In the exemplary embodiment in FIG. 7, if the occupancy sensor/control determines 448 the timeout period has not expired the occupancy sensor/control may be operable or configured to monitor the area to sense motion. As also shown in FIG. 7, if the occupancy sensor/control determines 448 the timeout period has expired, the occupancy sensor/control may be operable or configured to determine 450 whether the relative humidity information from the sensor 20 indicates that the relative humidity in the area is stable (e.g., because the previously detected high humidity event is still taking place).

As shown in FIG. 7, if the occupancy sensor/control determines 450 that the relative humidity information from the sensor 20 indicates that the relative humidity is stable, the occupancy sensor/control may be operable or configured to reset 452 the timeout period to extend the amount of time the illumination mechanism remains activated and again "monitor the area to sense motion. If, however, the occupancy sensor/control determines 450 that the relative humidity information from the sensor 20 does not indicate that the relative humidity is stable the occupancy sensor/control may be operable or configured to deactivate the illumination mechanism. In this way, the occupancy sensor/control may be operable or configured to deactivate the illumination mechanism when the timeout period (that commenced with an initial detected or sensed movement of an occupant) expires, motion is no longer sensed or detected, and the relative humidity information from the sensor 20 indicates that the previously relative humidity levels are falling (e.g., because the previously detected high humidity event, such as a shower, has ended).

Other aspects of the disclosure may include the control operable to provide a delayed off time to keep an exhaust fan ON for a minimum fixed, user adjustable, and/or adaptably determined amount of time. In other aspects, the control may be operable to keep a fan on until the humidity levels have fallen below the average fixed, user adjustable, and/or adaptably determined level of a humidity event. Further aspects include the control limiting the total time that the fan is turned on based on a fixed, user adjustable, and/or adaptably determined time level. In addition, aspects of the control may include turning off a fan when humidity levels return to a highly significant percentage (%) of the initial humidity level, providing a delayed off timeout when humidity levels return to a moderately significant percentage of the initial humidity level and turns the load off when the delayed off time is expired, turning a fan on automatically when excess is detected above a humidity relative humidity exceeds a user defined threshold, and providing a cycle mode that will cycle a fan on and off with a duty cycle, the duration and period of which are adjustable, e.g., user adjustable through a user interface on the control or remotely through wireless communication. In still other aspects, the control may include a cycle mode that cycles a fan on and off with a duty cycle, which cycle can be started and stopped by manual override. In still further aspects, the control may be operable for turning on and off the ventilation mechanism when the sensed humidity level drops below a predetermined limit, the humidity level drops below a predetermined percentage of the turn on level and below an average between a maximum humidity level and the turn on humidity level or some humidity level in between a maximum humidity level and turn on humidity level. Manually overriding of a fan may be provided, which may include maintaining an override mode until the predetermined timeout period expires or an overriding conditions matches automatic conditions whether the fan is on or off.

A1. A wall mounted device for automatically controlling a ventilation mechanism to manage the relative humidity of an area, the device comprising: a housing configured to be installed within an electrical box coupled to a wall of the area; a humidity sensor and an interface operably coupled to the housing and operable to obtain a sensed humidity of the area, a relative humidity input, and a relative humidity sensitivity level input regarding a rate of change of relative humidity; a control disposed in the housing and operable to control activation of the ventilation mechanism based on sensed humidity information from the humidity sensor, the relative humidity input, and the relative humidity sensitivity level input. A2. The wall mounted device of claim A1 further comprising a run time input operably coupled to the housing, and wherein the control is further operable to control activation of the ventilation mechanism based the run time input.

B1. A control for automatically turning on a ventilation mechanism to manage relative humidity in an area, the control comprising: wherein the control is operable to receive relative humidity information sensed in the area by at least one relative humidity sensor, wherein the control is operable to dynamically set a relative humidity sensitivity level regarding a rate of change of relative humidity, and operable to automatically turn on the ventilation mechanism based on the dynamically set relative humidity sensitivity level and the sensed relative humidity information. B2. The control of claim B1, further comprising an interface operable to obtain a relative humidity input, and wherein the control is operable to automatically turn on the ventilation mechanism based at least in part on the relative humidity level input, the sensed relative humidity information, and the dynamically set relative humidity sensitivity level.

C1. An apparatus for automatically turn on and turning off a ventilation mechanism to manage relative humidity in an area, the apparatus comprising: a control operable to receive relative humidity information sensed in the area by at least one relative humidity sensor; and an interface operably coupled to the control and operable to obtain inputs from a user, the inputs including a manual command mechanism, a run time input corresponding to a period of time, and at least one of a relative humidity input corresponding to relative humidity value and a relative humidity sensitivity level input corresponding to a rate of change of relative humidity, wherein the control is operable in an automatic mode to automatically turn on the ventilation mechanism based on the sensed relative humidity information and at least one of the relative humidity input and the relative humidity sensitivity level input, and operable in the automatic mode to automatically turn off the ventilation mechanism based on the sensed relative humidity information and at least the run time input, wherein the control is operable to turn on the ventilation mechanism for the run time input when the ventilation mechanism was automatically turned off by the control and the manual command mechanism is actuated, and operable to resume operation according to the automatic mode thereafter, and wherein the control is operable to turn off the ventilation mechanism when the ventilation mechanism was automatically turned on by the control and the manual command mechanism is actuated for the run time input or until the automatic mode would automatically turn off the ventilation mechanism, and operable to resume operation according to the automatic mode thereafter.

D1. A control for automatically activating a ventilation mechanism to manage relative humidity in an area, the control comprising: an interface operable to obtain a relative humidity input corresponding to a relative humidity level, and a run time input corresponding to a period of time, wherein the control is operable to receive relative humidity information sensed in the area by at least one relative humidity sensor, and wherein the control is operable to automatically turn on and off the ventilation mechanism over a predetermined period of time based on the relative humidity input and the relative humidity information, and wherein a total run time over the predetermined period of time being limited to the time corresponding to the run time input.

E1. A control for automatically controlling a ventilation mechanism to manage relative humidity in an area, the control comprising: an interface operable to obtain a run time input; and a motion sensor for obtaining motion information in the area, wherein the control is operable to receive relative humidity information sensed in the area by at least one relative humidity sensor, and wherein the control is operable to automatically turn on the ventilation based on the run time input, the sensed relative humidity information, and the motion information.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects. Furthermore, aspects of the disclosure may take the form of a computer program product embodied in one or more computer readable medium(s) having computer readable program code embodied thereon.

The arrangements, components, steps, aspects and features discussed or illustrated herein are only illustrative for the understanding of the disclosure; and are not meant to limit the scope of the inventions provided herein.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and metrics described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control device for a ventilation mechanism, the control device comprising:
    a processor;
    a memory;
    a plurality of different user selectable operational modes;
    a wireless interface configured to receive wireless communications from a wireless communication device; and
    an atmospheric sensor;
    wherein the control device is in wireless communication with the ventilation mechanism via a first wireless connection between the control device and the ventilation mechanism;
    wherein the control device is in wireless communication with the wireless communication device via a second wireless connection between the control device and the wireless communication device; and
    wherein a plurality of user selectable input settings set by a user of the wireless communication device are provided to the control device over the second wireless connection and the plurality of user selectable input settings allow the user of the wireless communication device to configure the control device to alter operation of the ventilation mechanism according to one of the plurality of different user selectable operational modes.

2. The control device according to claim 1, wherein the control device is operable to receive a sensed humidity level from the atmospheric sensor and selectively control a controllably conductive switch in electrical connection with the ventilation mechanism to alter operation of the ventilation mechanism.

3. The control device according to claim 1, wherein the plurality of user selectable input settings include a first user selectable input setting operable to provide a first input, a second user selectable input setting operable to provide a second input, and a third user selectable input setting operable to provide a third input.

4. The control device of claim 3, wherein the first user selectable input setting of the plurality of user selectable input settings comprises a time setting, the second user selectable input setting of the plurality of user selectable input settings comprises a humidity setting, and the third user selectable input setting of the plurality of user selectable input settings comprises a humidity sensitivity setting.

5. The control device of claim 4, wherein:
    the time setting is user selectable as between a plurality of available time value settings;
    the humidity setting includes an off setting, a cycle setting, and a humidity value setting; and
    the humidity sensitivity setting includes an off setting, a low humidity sensitivity value setting, a medium humidity sensitivity value setting, and a high humidity sensitivity value setting.

6. The control device of claim 5, wherein the differing user selectable operational modes include a first user selectable operational mode when the humidity setting is a humidity value setting and the humidity sensitivity setting is a setting other than the off setting, and wherein the control device is configured in the first user selectable operational mode to turn off the ventilation mechanism, after it was turned on at an activation time, based on:
    a) expiration of a first period of time extending from the activation time;
    b) the sensed humidity level being less than a first threshold humidity level; and
    c) the sensed humidity level being either:
        i) less than a second threshold humidity level that is less than the first threshold humidity level; or
        ii) between the first threshold humidity level and the second threshold humidity level.

7. The control device of claim 6, wherein the first threshold humidity level has a predetermined relationship to a sensed humidity level that is sensed before the activation time and a maximum sensed humidity level that is sensed after the activation time.

8. The control device of claim 6, wherein the second threshold humidity level has a predetermined relationship to a sensed humidity level that is sensed before the activation time or a maximum sensed humidity level that is sensed after the activation time.

9. The control device of claim 6, wherein the control device is configured in the first user-selected operational mode to turn off the ventilation mechanism, after it was turned on at an activation time, based on the sensed humidity level being between the first threshold humidity level and the second threshold humidity level after expiration of a second period of time that starts from when the sensed humidity level falls to the first threshold humidity level.

10. The control device of claim 6, wherein the control device is further configured in the first user selectable operational mode to turn on the ventilation mechanism based on the humidity sensitivity setting and the sensed humidity level.

11. The control device of claim 10, wherein the control device further comprises a manual command mechanism, and wherein the control device is further configured to, upon activation of the manual command mechanism, turn on the ventilation mechanism for a time corresponding to the time setting or to turn off the ventilation mechanism for a time corresponding to the time setting, and thereafter return operation of the ventilation mechanism according to the to the first user selectable operational mode.

12. The control device of claim 5, wherein the control device is operable in a mode of operation to dynamically set the humidity sensitivity setting regarding a rate of change of humidity, and operable in a mode of operation to automatically turn on the ventilation mechanism based on the dynamically set humidity sensitivity level.

13. A method for automatically turning off a ventilation mechanism that was turned on at an activation time to manage humidity in an area, the method comprising:
receiving humidity information sensed in the area;
receiving run time input; and
utilizing the humidity information and the run time input to automatically turn off the ventilation mechanism based on:
  a) lapse of the run time input after the activation time;
  b) a sensed humidity level in the area being less than a first threshold humidity level; and
  c) the sensed humidity level either:
    i) decreasing to less than a second threshold humidity level different from the first threshold humidity level; or
    ii) remaining between the first threshold humidity level and a second threshold humidity level until expiration of a period of time that starts from when the sensed humidity level falls to the first threshold humidity level.

14. The method of claim 13, wherein the first threshold humidity level has a predetermined relationship to a humidity level sensed in the area before the activation time and a maximum humidity level sensed in the area after the activation time.

15. The method of claim 13, wherein the second threshold humidity level has a predetermined relationship to a sensed humidity level in the area before the activation time or a maximum humidity level in the area after the activation time.

16. The method of claim 13, wherein the method automatically turns off the ventilation mechanism at an earlier of (i) the sensed humidity level decreasing to less than the second threshold humidity level and (ii) expiration of the period of time that starts from when the sensed humidity level falls to the first threshold humidity level.

17. A control device for a ventilation mechanism, the control device comprising:
a processor;
a memory;
a plurality of different user selectable operational modes;
a wireless interface configured to receive wireless communications from a wireless communication device; and
an atmospheric sensor;
wherein the control device is in wireless communication with the wireless communication device via a wireless connection between the control device and the wireless communication device; and
wherein a plurality of user selectable input settings set by a user of the wireless communication device are provided to the control device over the wireless connection and the plurality of user selectable input settings allow the user of the wireless communication device to configure the control device to alter operation of the ventilation mechanism according to one of the plurality of different user selectable operational modes, and wherein the control device is configured, in a user selectable operational mode of the plurality of different user selectable operation modes, to perform:
turning on the ventilation mechanism at an activation time based on a sensed humidity level being equal to or greater than an activation humidity level; and
automatically turning off the ventilation mechanism based on:
  a) the sensed humidity level being less than a first threshold humidity level; and
  b) the sensed humidity level either:
    i) decreasing to less than a second threshold humidity level different from the first threshold humidity level; or
    ii) remaining between the first threshold humidity level and a second threshold humidity level until expiration of a period of time that starts from when the sensed humidity level falls to the first threshold humidity level.

18. The control device of claim 17, wherein the automatically turning off the ventilation mechanism automatically turns off the ventilation mechanism at an earlier of (i) the sensed humidity level decreasing to less than the second threshold humidity level and (ii) expiration of the period of time that starts from when the sensed humidity level falls to the first threshold humidity level.

19. The control device of claim 17, wherein based on the sensed humidity level dropping to the second threshold humidity level during the period of time that starts from when the sensed humidity level falls to the first threshold humidity level, the automatically turning off automatically turns off the ventilation mechanism when the humidity level drops to less than the second threshold humidity level.

* * * * *